US012761845B2

(12) United States Patent
Iida

(10) Patent No.: US 12,761,845 B2
(45) Date of Patent: Oct. 13, 2026

(54) IMAGE FORMING APPARATUS CAPABLE OF ACCEPTING MULITPLE TYPES OF PRINT JOBS AND METHOD

(71) Applicant: CANON KABUSHIKI KAISHA, Tokyo (JP)

(72) Inventor: Toshihiko Iida, Ibaraki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 253 days.

(21) Appl. No.: 18/627,543

(22) Filed: Apr. 5, 2024

(65) Prior Publication Data

US 2024/0345784 A1 Oct. 17, 2024

(30) Foreign Application Priority Data

Apr. 14, 2023 (JP) ................................ 2023-066621

(51) Int. Cl.
*G06F 3/12* (2006.01)

(52) U.S. Cl.
CPC .......... *G06F 3/1239* (2013.01); *G06F 3/1219* (2013.01)

(58) Field of Classification Search
CPC ............................ G06F 3/1239; G06F 3/1219
USPC ....... 358/1.9, 1.1, 1.14; 271/3.15, 9.01, 9.05
See application file for complete search history.

(56) References Cited

U.S. PATENT DOCUMENTS 8,867,056 B2 10/2014 Yamada
2009/0328159 A1* 12/2009 Luo ........................ H04N 1/446 726/4
2016/0062291 A1* 3/2016 Tao .................... G03G 15/6514 399/80

FOREIGN PATENT DOCUMENTS

| | | | |
|---|---|---|---|
| JP | 2004131247 A | * | 4/2004 |
| JP | 2005300605 A | * | 10/2005 |
| JP | 2007-093787 A | | 4/2007 |
| JP | 2019084798 A | * | 6/2019 |

* cited by examiner

*Primary Examiner* — Jamares Q Washington
(74) *Attorney, Agent, or Firm* — VENABLE LLP

(57) ABSTRACT

An image forming apparatus sets, for each of a plurality of types of print jobs, whether to permit use of paper in a predetermined paper feed stage, and controls, in a case where a print job that uses the paper in the predetermined paper feed stage is received, based on the type of the received print job and the setting, whether to execute the print job that uses the paper in the predetermined paper feed stage. The received print job is held as a stored print job, a list of the held stored print jobs is displayed, and print processing is executed based on the stored print job selected from the list. Selection of a plurality of stored print jobs from the list is disabled when the plurality of stored print jobs include a print job for which use of resources is restricted and a print job for which use of resources is unrestricted.

10 Claims, 16 Drawing Sheets

FIG. 15

1500

| | 1501 | 1502 |
|---|---|---|
| | DESTINATION PORT | DESTINATION PROGRAM |
| 1503 | 8080 | JDF ANALYSIS PROGRAM |
| 1504 | 9100 | PS ANALYSIS PROGRAM |
| 1505 | 9200 | LIPS ANALYSIS PROGRAM |
| 1506 | 515 | PDF ANALYSIS PROGRAM |

IMAGE FORMING APPARATUS CAPABLE OF ACCEPTING MULITPLE TYPES OF PRINT JOBS AND METHOD

BACKGROUND OF THE INVENTION

Field of the Invention

The present invention relates to an image forming apparatus and a method.

Description of the Related Art

Among printed products used in conventional operations, a special printed product, a printed product whose number of copies is relatively large, and a printed product that requires high image quality are often created by outsourcing to a printing company or the like because of difficulty in setting, image quality, and a productivity problem. Examples are printed products such as envelopes, postcards, business cards, a graphic art image, and a large-scale document for presentation. Along with the high-functionality of a digital printer, such printed product can be created in the company. In recent years, the quality and productivity of an office MFP are improved and the size of the MFP is reduced, and thus the MFP has performance that suffices for use in an in-house printing operation. Along with the spread of cloud technology and improvement in operability, a workflow application that was expensive and complicated can currently be used easily at a low cost.

An MFP for an office operation is sometimes used for both an office operation and an in-house printing operation. In an office operation, copy paper that can be purchased inexpensively is used and a printer driver that can easily execute printing is used. On the other hand, in an in-house printing operation, the image quality and form are important, and thus special coated paper, synthetic paper, an envelope, or the like is used. To input a print instruction, a workflow application that can make fine print settings and perform job management is used. In this way, the paper and application are selectively used in accordance with an office operation or an in-house print operation.

Japanese Patent Laid-Open No. 2007-93787 describes a technique in which only a specific user can use paper in a paper tray.

When a printing apparatus is shared among different types of operations, printing resources may be used in an unintended operation. Although Japanese Patent Laid-Open No. 2007-93787 describes a technique in which only a specific user can use paper in a paper tray, printing resources may be used in an unintended operation in an environment where the user is responsible for different types of operations.

SUMMARY OF THE INVENTION

The present invention provides an image forming apparatus that appropriately controls the use of resources by a print job, a method, and a program.

The present invention in one aspect provides an image forming apparatus capable of accepting a plurality of types of print jobs, comprising: one or more memories that store instructions; and one or more processors configured to execute the instructions stored in the one or more memories to set, for each type of the print job, whether to permit use of paper in a predetermined paper feed stage, and control, in a case where a print job that uses the paper in the predetermined paper feed stage is received, based on the type of the received print job and the setting, whether to execute the print job that uses the paper in the predetermined paper feed stage.

Further features of the present invention will become apparent from the following description of exemplary embodiments with reference to the attached drawings.

BRIEF DESCRIPTION OF THE DRAWINGS

FIG. 15 is a table showing the correspondence between a print job type and a destination port.

DESCRIPTION OF THE EMBODIMENTS

Figure 1:
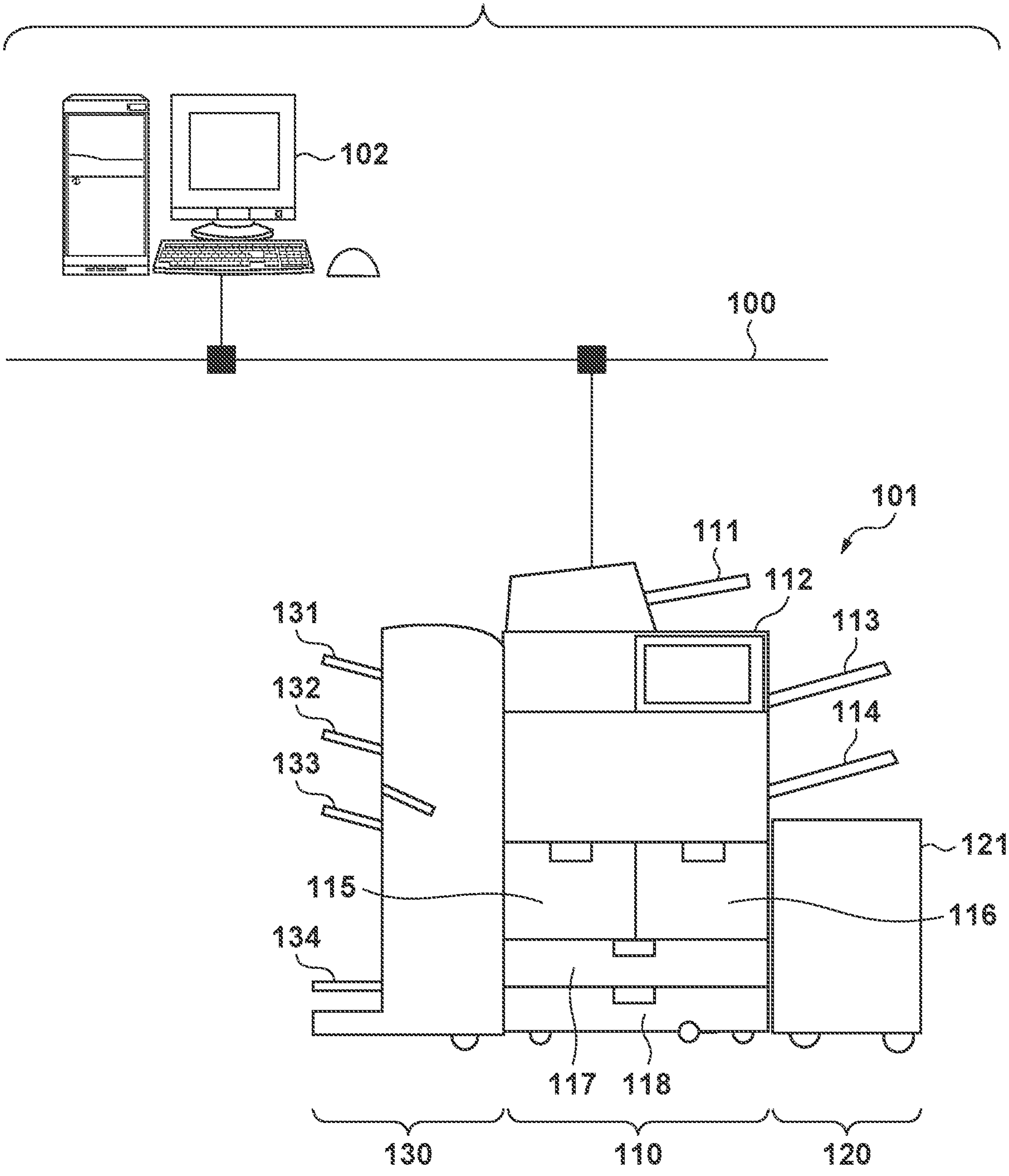
FIG. 1 is a view showing the configuration of a print processing system.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

First Embodiment

This embodiment assumes a case where an image forming apparatus 101 for an office operation is used for an office operation and an in-house printing operation. In an office operation, copy paper that can be purchased inexpensively is used and a printer driver that can easily execute printing is used. On the other hand, in an in-house printing operation, since the image quality and form are important, a workflow application that can make fine print settings and perform job management is used to input a print instruction. This embodiment will exemplify Job Definition Format (JDF) as a print job type used by a workflow application. Furthermore, PostScript will be exemplified as a print job type used by a printer driver. However, this embodiment is not limited to these print job types and another print job type may be used in each operation.

FIG. 1 is a view showing an example of the configuration of a print processing system according to this embodiment.

This embodiment will describe a Multifunction Peripheral (MFP) as an example of the image forming apparatus 101, and describe a PC as an example of an information processing apparatus 102.

However, another apparatus may be used as the image forming apparatus 101. For example, a Single-Function Printer (SFP) having no reading function may be used. Another apparatus may be used as the information processing apparatus 102. For example, a smartphone or a table terminal may be used. The image forming apparatus 101 and the information processing apparatus 102 are communicably connected via a network 100. The network 100 may be a wired network, a wireless network, and a network including both.

Note that FIG. 1 shows a case where one information processing apparatus 102 is provided in the print processing system. However, the image forming apparatus 101 and a plurality of information processing apparatuses 102 may be communicably connected via the network 100. Furthermore, a case where the print processing system of this embodiment includes the image forming apparatus 101 and the information processing apparatus 102 is exemplified but the present invention is not limited to this. For example, the image forming apparatus 101 may serve as a print processing system. In execution of image forming processing executable by the image forming apparatus 101 alone, for example, a copy job or the like, the information processing apparatus 102 connected to the network 100 is not necessary.

The arrangement of the information processing apparatus 102 will be described first. The information processing apparatus 102 executes various kinds of programs such as an application program (to be simply referred to as an application hereinafter) that inputs a job. A printer driver and a workflow application are installed in the information processing apparatus 102. A user who wants to execute printing can input a print instruction from various applications. The printer driver converts a file to be printed and print settings into PostScript data based on a print instruction, and transmits the data as print data to the image forming apparatus 101. The workflow application creates a JDF file based on the print instruction, and transmits, as print data, the JDF file together with a designated print file to the image forming apparatus 101. Note that various forms may be used for a method of transmitting print data to the image forming apparatus 101. For example, print data may be transmitted to the image forming apparatus 101 via a print application or a printer driver, or may be transmitted to the image forming apparatus 101 via a cloud server (not shown).

The image forming apparatus 101 will be described next. The image forming apparatus 101 has a reading function of reading an image on a sheet and a print function of printing an image on a sheet as a print medium. In addition, the image forming apparatus 101 has a post-processing function of binding a plurality of sheets with images printed thereon, aligning a plurality of sheets, or dividing the discharge destination of a plurality of sheets to a plurality of trays (discharge trays). Note that the sheets include plain paper, coated paper, an envelope, and label paper. In this embodiment, paper indicates an example of a sheet.

The image forming apparatus 101 is configured to perform complex sheet processing by connecting a plurality of apparatuses having different roles. Respective portions forming the image forming apparatus 101 will be described below.

Based on received print data, a printer unit 110 forms (prints) an image on a sheet fed from a paper feeding unit using toner. The arrangement and operation principle of the printer unit 110 will be described below. A light beam such as a laser beam modulated in accordance with image data is reflected by a rotating polyhedral mirror (polygon mirror or the like), and a photosensitive drum is irradiated with the reflected beam as scan light. An electrostatic latent image formed on the photosensitive drum by the laser beam is developed by toner, and a toner image is transferred to a sheet attached to a transfer drum. The series of image forming processes is sequentially executed for yellow (Y), magenta (M), cyan (C), and black (K) toners, thereby forming a full-color image on the sheet. In addition to the four colors, a toner called a spot color or a transparent toner may be transferred. The sheet on the transfer drum, on which the full-color image is formed, is conveyed to a fixing unit. The fixing unit includes a roller and a belt, incorporates a heat source such as a halogen heater in the roller, and melts and fixes, to the sheet, the toners on the sheet with the toner images transferred thereon by heat and pressure.

Note that a scanner unit 111 is provided in the printer unit 110 of the image forming apparatus 101 according to this embodiment. Furthermore, an operation unit 112 is provided on the front surface of the printer unit 110. The operation unit 112 displays various interface screens that can accept various settings and operations of the printer unit 110 from the user. Furthermore, the image forming apparatus 101 is configured such that various kinds of apparatuses to be described below in addition to the printer unit 110 can be attached thereto.

A large-capacity paper feeding apparatus 120 is a feeding apparatus detachable from the printer unit 110. The large-capacity paper feeding apparatus 120 includes one or more paper feeding units 121. With this arrangement, the printer unit 110 can execute print processing on an enormous number of sheets.

The image forming apparatus 101 can roughly be divided into three portions including the printer unit 110. Referring to FIG. 1, an apparatus arranged on the right side of the printer unit 110 is called a paper feeding system apparatus. The paper feeding system apparatus continuously supplies sheets loaded inside to the printer unit 110 at an appropriate timing. The paper feeding system apparatus also performs detection of the remaining quantity of sheets loaded inside. Paper feed cassettes 114, 115, 116, 117, and 118 are also provided in the printer unit 110, and can execute the same function as the paper feeding system apparatus. The paper feeding units provided in the printer unit 110 are also called paper feeding system apparatuses for the descriptive convenience.

On the other hand, referring to FIG. 1, an apparatus arranged on the left side of the printer unit 110 is called a sheet working apparatus, or is also called a sheet processing apparatus or a post-processing apparatus. The sheet working apparatus applies various kinds of working processes for sheets that have undergone print processing, or perform processing such as accumulation. The above-described paper feeding system apparatuses and the sheet working apparatus will sometimes collectively be referred to as a sheet processing apparatus in the following description. A sheet processing apparatus 130 includes a plurality of discharge trays 131, 132, 133, and 134 as the discharge destinations of sheets. In addition, the printer unit 110 also includes a discharge tray 113. The user can selectively use these discharge trays to prevent discharged sheets from being mixed. The image forming apparatus 101 is provided with a discharge tray for limited use, like the discharge tray 134 generally called a saddle tray. The discharge tray for limited use is a discharge tray that is automatically selected as a discharge destination when a specific function is used.

Figure 2:
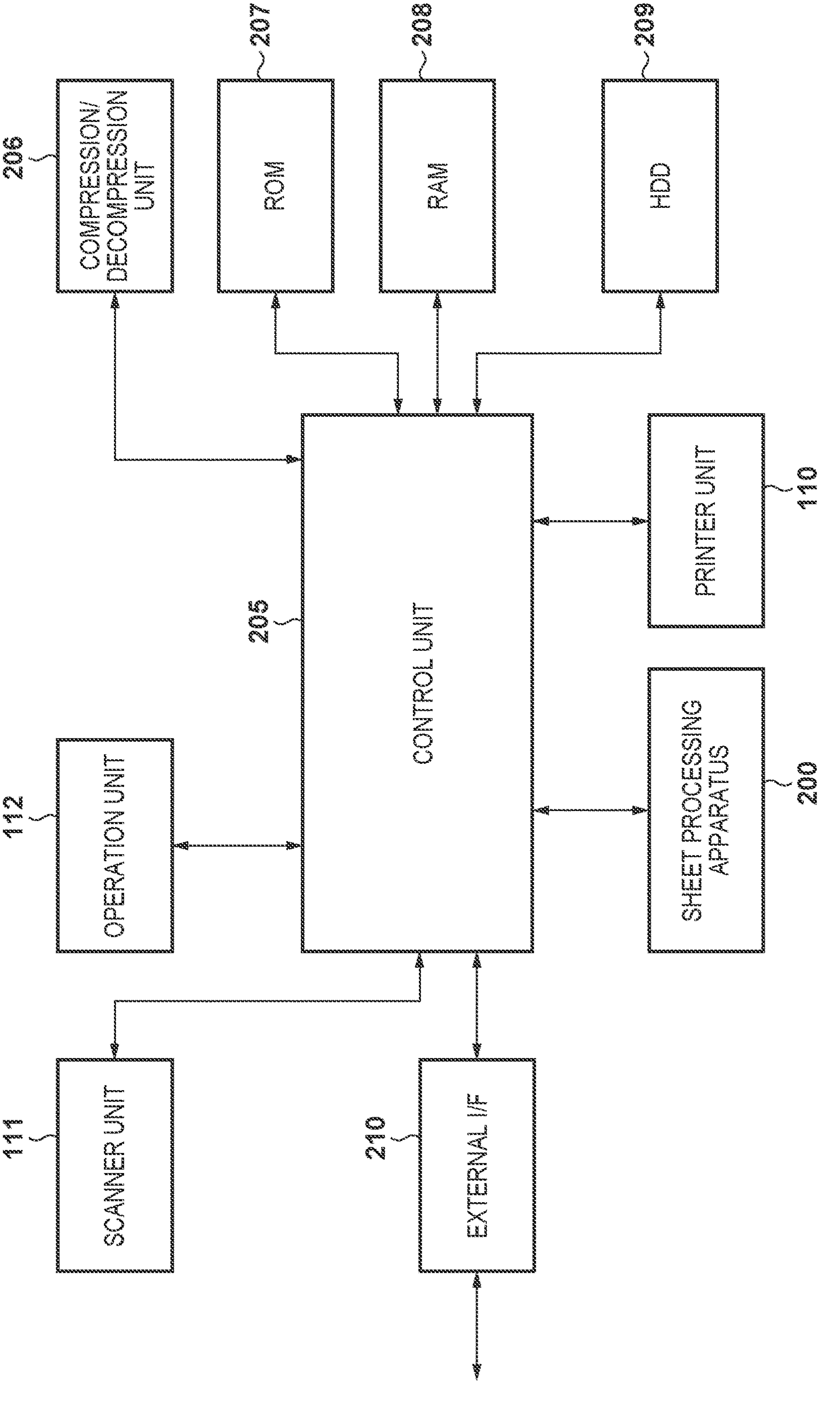
FIG. 2 is a block diagram showing the hardware arrangement of an image forming apparatus.

FIG. 2 is a block diagram showing an example of the hardware arrangement of the image forming apparatus 101. The image forming apparatus 101 has a reading function of reading an image on a sheet and a print function of printing an image on a sheet. In addition, the image forming apparatus 101 has a post-processing function of binding a plurality of sheets with images printed thereon, aligning a plurality of sheets, or dividing the discharge destination of a plurality of sheets to a plurality of trays.

The image forming apparatus 101 has a copy function of storing, in an HDD 209, data accepted from the scanner unit 111, reading out the data from the HDD 209, and printing it by the printer unit 110. In addition, the image forming apparatus 101 has a print function of storing, in the HDD 209, print job data received from an external apparatus such as the information processing apparatus 102 via an external I/F 210, reading out the data from the HDD 209, and printing it by the printer unit 110. In this embodiment, the image forming apparatus 101 is, for example, a Multifunction Peripheral (MFP) having such a plurality of functions. Note that the image forming apparatus 101 can execute at least one of color printing and monochrome printing. The scanner unit 111 optically reads an original image set on an original table (not shown), processes image data obtained by reading the original image, and outputs the image data.

When a CPU included in a control unit 205 that comprehensively controls the image forming apparatus 101 reads out a program stored in a ROM 207 and executes it, the operation of the image forming apparatus 101 according to this embodiment is implemented. The ROM 207 also stores a program to be executed by the control unit 205 to perform an operation of interpreting page description language (PDL) data received from an external apparatus via the external I/F 210 and rasterizing the data into raster image data (bitmap image data). Similarly, the ROM 207 also stores a program to be executed by the control unit 205 to interpret a job received from an external apparatus via the external I/F 210 and process it. The ROM 207 is a read only memory and stores various kinds of programs such as a boot sequence and font information. Details of the various kinds of programs stored in the ROM 207 will be described later. A RAM 208 is a readable/writable memory and stores image data transmitted from the scanner unit 111 or the external I/F 210, various kinds of programs, setting information, and the like.

The HDD 209 also stores image data compressed by a compression/decompression unit 206. The HDD 209 is configured to hold job data such as print data of a job to be processed. The control unit 205 stores, in the HDD 209, job data to be processed, that has been input via various kinds of input units such as the scanner unit 111 and the external I/F 210, reads out the job data from the HDD 209, and outputs it to the printer unit 110, thereby executing printing. Furthermore, the control unit 205 controls to transmit the job data read out from the HDD 209 to an external apparatus via the external I/F 210. As described above, the control unit 205 executes various kinds of output processes of job data to be processed in the HDD 209. The compression/decompression unit 206 performs compression/decompression processing of image data stored in the RAM 208 or the HDD 209 using various kinds of compression methods such as JBIG and JPEG. The control unit 205 also controls the operation of a sheet processing apparatus 200. The sheet processing apparatus 200 corresponds to the paper feeding system apparatus or sheet working apparatus described with reference to FIG. 1.

The external I/F 210 transmits/receives image data to/from an external apparatus such as a facsimile or a network connection device. The HDD 209 stores various kinds of management information to be managed by the image forming apparatus 101 in addition to the above data. The image forming apparatus 101 includes the printer unit 110 that executes print processing of job data to be printed in the HDD 209. The image forming apparatus 101 includes the operation unit 112 with a display unit. The ROM 207 stores programs to be executed by the controller unit 205 to execute various kinds of processes of flowcharts to be described later. Furthermore, the ROM 207 stores various kinds of control programs necessary in this embodiment. The ROM 207 also stores a display control program configured to display various user interfaces (UIs) on the display unit of the operation unit 112.

Figure 3:
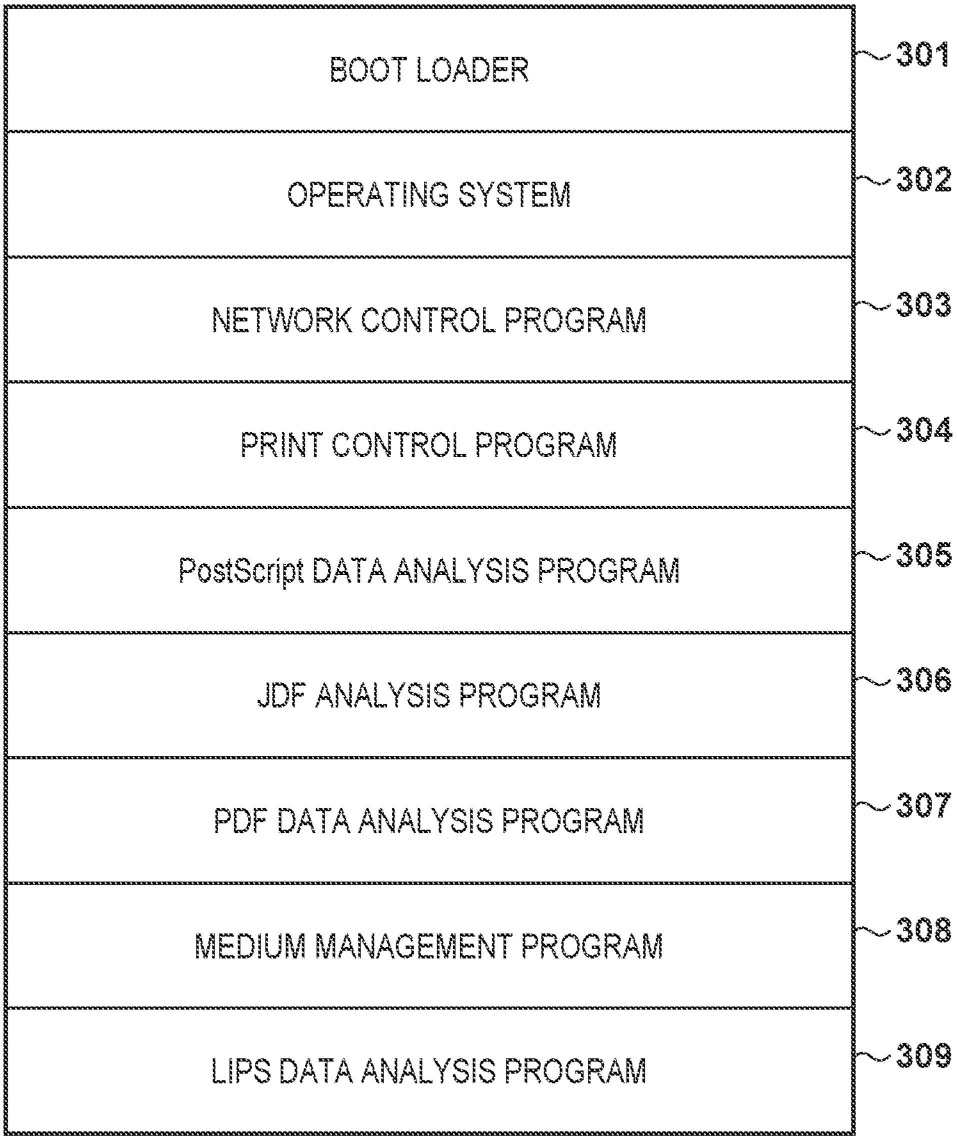
FIG. 3 is a block diagram showing the software arrangement of the image forming apparatus.

FIG. 3 is a block diagram showing an example of the software arrangement of the image forming apparatus 101. A boot loader 301 is a program executed immediately after the image forming apparatus 101 is powered on. The boot loader 301 includes a program configured to execute various kinds of activation sequences necessary for activation of the system. An operating system 302 is a program aiming at providing an execution environment for various kinds of programs for implementing the functions of the image forming apparatus 101. This program mainly provides the functions of resource management of the memories of the image forming apparatus 101, that is, the ROM 207, the RAM 208, and the HDD 209 and basic input/output control of the units shown in FIG. 2.

A network control program 303 is a program executed when transmitting/receiving data to/from a device connected via the network 100. The network control program 303 implements reception processing of a file to be printed, data transmission from an external apparatus, and transmission/reception of a command. The network control program 303 refers to, for example, an address and destination port included in reception data to decide a program to which the reception data is to be transferred. The network control program 303 includes a driver program configured to control the external I/F 210.

A print control program 304 is a program configured to process an accepted print job. The basic operation of the print control program 304 is as follows. That is, the print control program 304 stores, in the HDD 209, job data received from the external I/F 210, and holds a reception order. The print control program 304 instructs the printer unit 110 to execute print processing based on the reception order. In a print instruction, resources such as paper and a discharge destination decided by a method to be described later are designated.

If a destination port assigned to a PostScript data analysis program 305 is designated in the reception data, the network control program 303 distributes the reception data to the PostScript data analysis program 305. Upon receiving the reception data, the PostScript data analysis program 305 sequentially analyzes the data, and instructs the print control program 304 to create a print job. After that, based on a processing order managed by the print control program 304, the control unit 205 sequentially instructs the operations of the respective devices in accordance with the processing order. As a result, control is performed to finally execute printing.

A JDF analysis program 306 is a program configured to analyze print settings. The print settings are transmitted together with image data by data in the JDF format or the like. Based on the analyzed print settings, the control unit 205 sequentially instructs the operations of the respective devices. As a result, control is performed to finally execute printing with the designated print settings. When analysis of the JDF data ends or the JDF data is accepted, the JDF analysis program 306 instructs the print control program 304 to create a JDF print job.

A PDF data analysis program 307 is a program configured to analyze accepted PDF data. The PDF data may be transmitted by Line Printer Daemon Protocol (LPR) or may be accepted as a JDF job. Alternatively, the JDF analysis program 306 may transfer the PDF data to the PDF data analysis program 307. In this case, the PDF data analysis program 307 notifies the JDF analysis program 306 of the analysis result.

A medium management program 308 is a program configured to execute a management function of managing sheets usable by the image forming apparatus 101. Sheet associated information managed by the medium management program 308 is stored in the HDD 209. The medium management program 308 manages a type of paper stored in each paper feed tray.

If a destination port assigned to a LIPS data analysis program 309 is designated in the received data, the network control program 303 distributes the data to the LIPS data analysis program 309. Note that LIPS is an abbreviation for LBP Image Processing System. Subsequent processing is the same as the PostScript data analysis program 305. The assigned destination port is a destination port different from that in the case of the PostScript data analysis program 305.

Figure 4:
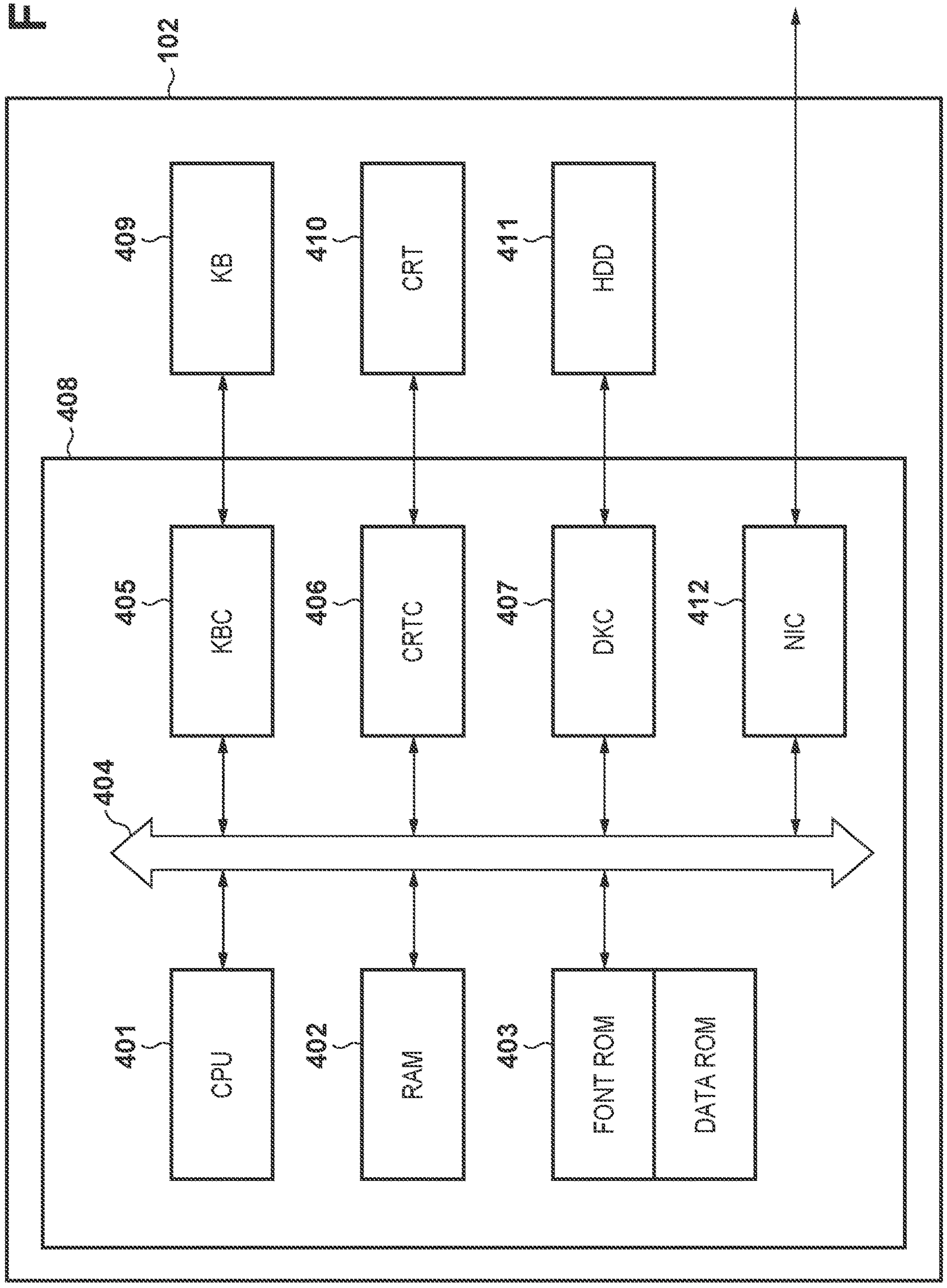
FIG. 4 is a block diagram showing the hardware arrangement of an information processing apparatus.

FIG. 4 is a block diagram showing an example of the hardware arrangement of the information processing apparatus 102. A CPU 401 executes an OS or various application programs stored in a program ROM of a ROM 403 or loaded from an HDD 411 into a RAM 402. The ROM 403 includes a font ROM and a data ROM. The RAM 402 functions as a main memory, a work area, or the like of the CPU 401. A keyboard controller (KBC) 405 controls input from a keyboard (KB) 409 or a pointing device (not shown). A display controller (CRTC) 406 controls display on a display unit (CRT) 410. A disk controller (DKC) 407 controls access to the HDD 411 storing a boot program, various applications, font data, and the like. The network controller (NIC) 412 executes communication control processing with another device connected to the network 100. A bus 404 connects the CPU 401, the RAM 402, the ROM 403, various kinds of controllers, and the like, thereby conveying data signals and control signals.

Note that if the information processing apparatus 102 is a portable terminal, a touch panel controller or the like may be formed instead of the keyboard controller (KBC) 405. A mass storage device may be provided instead of the HDD 411. Furthermore, a network controller (NIC) 412 may include a wired LAN, a wireless LAN, or both of them. The differences in internal components are hidden in the network controller (NIC) 412, and these components are equivalent for other modules shown in FIG. 4. A plurality of NICs 412 may be provided. The arrangement of the information processing apparatus 102 is not limited to that shown in FIG. 4, and the information processing apparatus 102 appropriately includes a block corresponding to a function that can be implemented by a device applied to the information processing apparatus 102.

Figure 5:
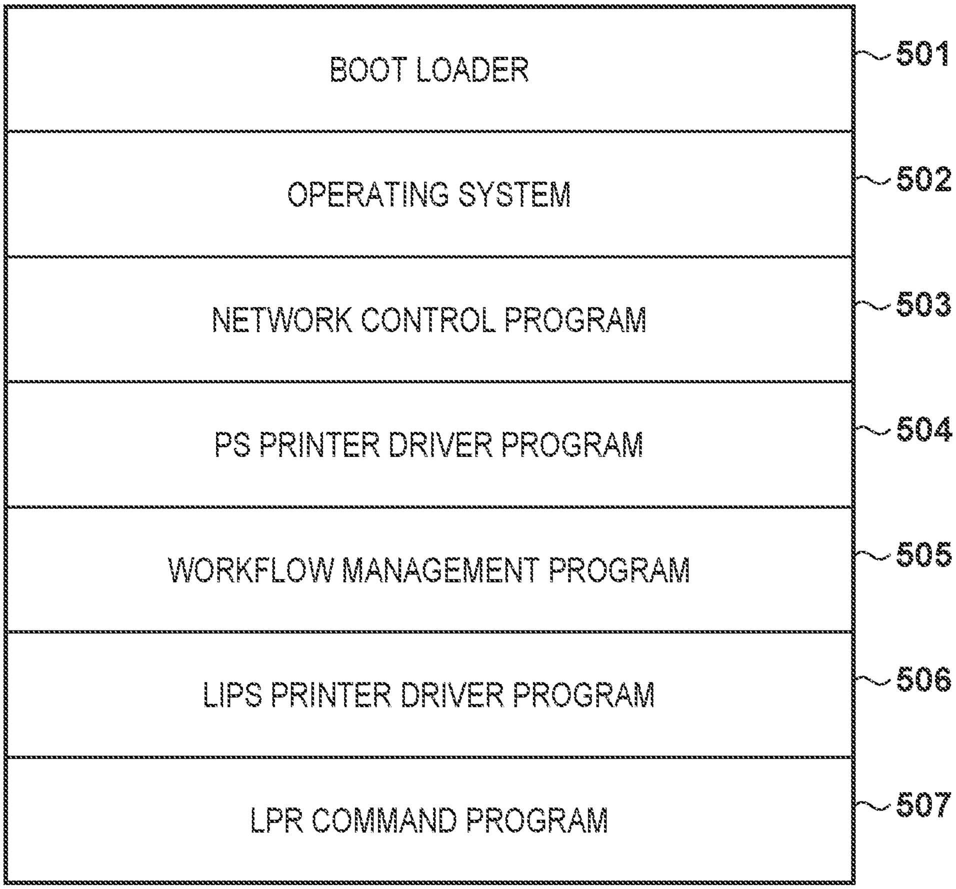
FIG. 5 is a block diagram showing the software arrangement of the information processing apparatus.

FIG. 5 is a block diagram showing an example of the software arrangement of the information processing apparatus 102. A boot loader 501 is a program executed immediately after the information processing apparatus 102 is powered on. The boot loader 501 includes a program configured to execute various kinds of activation sequences necessary for activation of the system. An operating system 502 is a program aiming at providing an execution environment for various kinds of programs for implementing the functions of the information processing apparatus 102. The operating system 502 provides the functions of resource management of the memories of the information processing apparatus 102, that is, the ROM 403, the RAM 402, and the HDD 411.

A network control program 503 is a program executed when transmitting/receiving data to/from a device connected via the network 100. That is, the network control program 503 controls the NIC 412 to implement transmission/reception of data or a file to/from an external apparatus via the network 100. The network control program 503 accepts a data transmission instruction from another program, adds an appropriate header to data, and transmits the data to a transmission destination.

A PostScript (PS) printer driver program 504 is a program configured to transmit a PostScript print job to the image forming apparatus 101. Upon executing a print instruction by the operating system 502, a print setting screen provided by the PS printer driver program 504 is displayed on the display unit 410. In an office operation or the like, the user makes arbitrary print settings on the print setting screen, and then instructs printing. The PS printer driver program 504 converts the print settings and original data into PostScript data, and instructs to transmit the data to the destination port exclusively assigned to a PostScript print job by the image forming apparatus 101. Since the PS printer driver program 504 is a program dedicated to the image forming apparatus 101, it holds a destination port in the program. The network control program 503 adds a header including a destination port to data and transmits the data so that the reception side can decide a program for processing the data.

A workflow management program 505 is a program configured to manage an in-house printing operation by the image forming apparatus 101. The workflow management program 505 is configured to register and manage different kinds of image forming apparatuses 101 and distribute input of a print job. JDF and Job Messaging Format (JMF) as standard specifications are used to transmit/receive data to/from the image forming apparatus 101. Therefore, even if the manufacturers of the image forming apparatuses 101 are different, it is possible to input the same print instruction by the same JFM data or JDF data. The image forming apparatus 101 determines an address and destination port for accepting a JDF job. When registering the image forming apparatus 101 in the workflow management program 505, it is required to input a correct address and destination port. The input address and destination port are stored in the HDD 411 or the RAM 402. After making arbitrary print settings and instructing printing by the workflow management program 505, the workflow management program 505 creates JDF data from the instructed print settings. Then, the workflow management program 505 instructs the network control program 503 to add a header including the stored address and destination port to data and transmit the data.

A LIPS printer driver program 506 is a program configured to transmit a LIPS print job to the image forming apparatus 101. The difference from the PS printer driver program 504 is that the type of a print job to be created is LIPS and a port exclusively assigned to a LIPS job by the image forming apparatus 101 is designated as a destination port at the time of transmission. It is normally unnecessary to install two kinds of printer driver programs in the same image forming apparatus 101. On the other hand, it is necessary to install printer driver programs in different image forming apparatuses, respectively.

An LPR command program 507 is a program configured to transmit a print job to the image forming apparatus 101 by LPR. LPR transmits print data by standard specifications. LPR transmits designated original data intact without creating data.

Therefore, it is impossible to make fine print settings and original data is printed intact. Note that a print job transmitted by LPR is sometimes referred to as direct printing.

FIGS. 6A to 6E and 7 are views each showing an example of a user interface screen displayed on the operation unit 112 of the image forming apparatus 101 in the print processing system according to this embodiment. Settings displayed on the screen shown in each of FIGS. 6A to 6E and 7 are settings for the whole print processing system, and are effective for all print jobs accepted after making the settings.

Figure 6A:
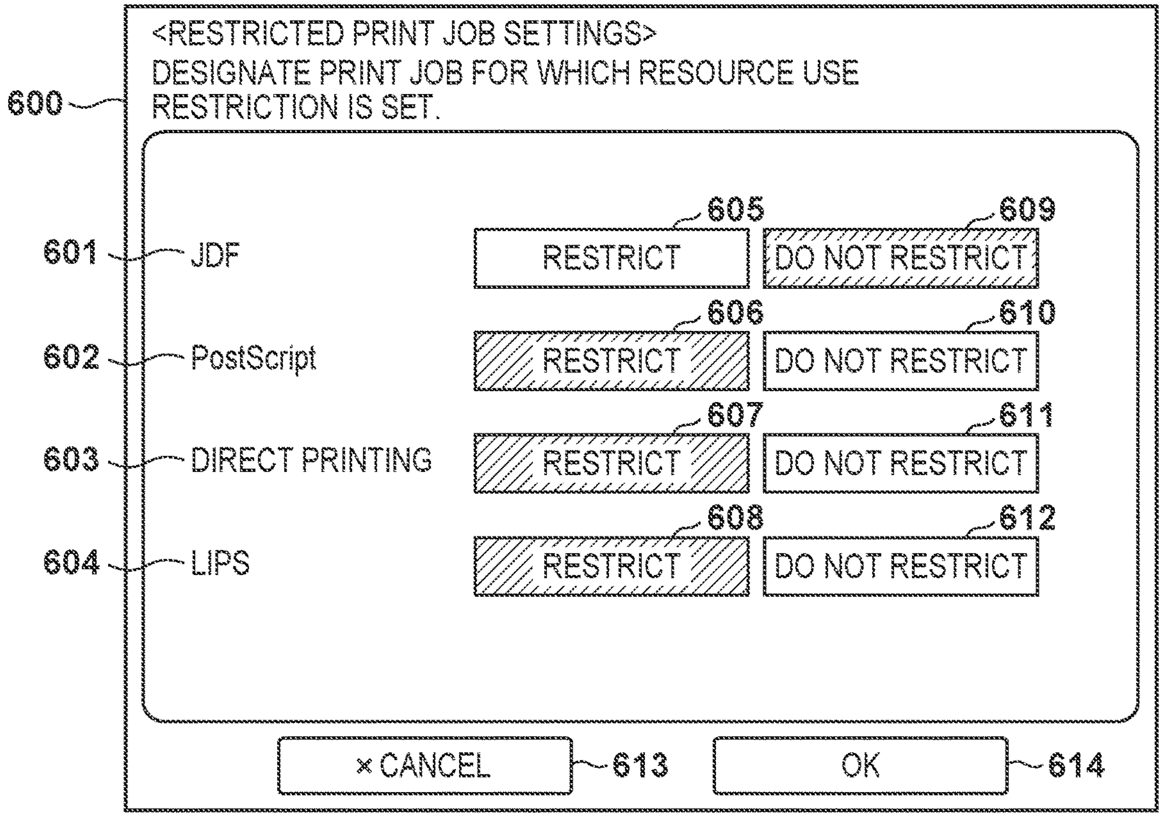
FIGS. 6A to 6E are views each showing a user interface screen displayed by the image forming apparatus.

When, for example, a restricted print job setting button (menu) is selected from a device setting screen (not shown), the control unit 205 displays a restricted print job setting screen 600 shown in FIG. 6A on the operation unit 112. The restricted print job setting screen 600 is a screen for designating a print job for which use of resources such as paper, a paper feed tray, and a discharge tray is restricted.

Each of print job type selection displays 601, 602, 603, and 604 is a display indicating the type of a print job. "Restricted" buttons 605 to 608 used to respectively set the restricted use of resources for the print job types are provided. The print job type corresponds to a function used when instructing to execute printing. For example, a job instructed using JDF is a JDF print job, and a job instructed using PostScript is a PostScript print job.

The print job type selection display 601 indicates a job type for which a print instruction is input using JDF. JDF is an industry-standard job ticket that can be used in combination with various page description languages. If a print instruction is input using JDF, a print job type is JDF regardless of a page description language. JDF is a standard specification in which fine print settings can be described, and it is possible to acquire information from the image forming apparatus using JMF. Therefore, it is possible to dynamically create print settings independently of the image forming apparatus. Thus, a workflow application supporting various kinds of image forming apparatuses inputs a print instruction using JDF.

The print job type selection display 602 indicates a job type for which a print instruction is input using the page description language PostScript. In PostScript, there is no method of acquiring information from the image forming apparatus, and thus the application cannot dynamically perform print designation in accordance with arrangement information. In addition, many print setting items are set uniquely for the image forming apparatus or manufacturer. The application using PostScript needs to individually cope with each image forming apparatus. Therefore, the job type is used not in the workflow application but in a printer driver provided by the manufacturer of the image forming apparatus and supporting the image forming apparatus.

The print job type selection display 603 indicates a job type for which an instruction is input to directly print a file without converting the file into a page description language for printing. For example, there is provided a method of instructing to print a PDF file or an image file using LPR. In the case of direct printing, a print original includes no print settings and thus it is necessary to make print settings by any method. Since the method of making print settings depends on a printer, the job type is not used in the workflow application that does not individually cope with each printer.

The print job type selection display 604 indicates a job type for which a print instruction is input using the page description language LIPS. LIPS is a page description language unique to the manufacturer, and is used to instruct a printer provided by the manufacturer to execute printing. Each of the manufacturers of the image forming apparatuses develops a unique page description language, and uses it to input a print instruction of a printer driver or the like. The page description language unique to each manufacturer cannot be used in a printer of another manufacturer, and is thus not used in the workflow application.

The "restricted" buttons 605 to 608 are buttons respectively corresponding to the print job type selection displays 601 to 604. When the user selects each of the "restricted" buttons 605 to 608, the restricted use of the resources can be set for the corresponding print job type. "Unrestricted" buttons 609 to 612 are buttons respectively corresponding to the print job type selection displays 601 to 604. When the user selects each of the "unrestricted" buttons 609 to 612, the unrestricted use of resources can be set for the corresponding print job type.

When each of the "restricted" buttons 605 to 608 and the "unrestricted" buttons 609 to 612 is selected, the button is set in a selected state. One of the "restricted" button and the "unrestricted" button for the same print job type is always in the selected state and the other is in an unselected state. If the button that is not in the selected state is selected, the selected button is set in the selected state, and the selected state of the other button is canceled.

A cancel button 613 is a button used to discard the settings. When the cancel button 613 is selected, the selection operation performed on the restricted print job setting screen 600 is discarded, thereby transitioning to the screen before transition. An OK button 614 is a button used to save the settings. When the OK button 614 is selected, the current resource use restriction settings are stored in the HDD 209 or the RAM 208, thereby transitioning to the screen before transition. When the restricted print job setting screen 600 is displayed next, the stored values are applied.

Figure 6B:
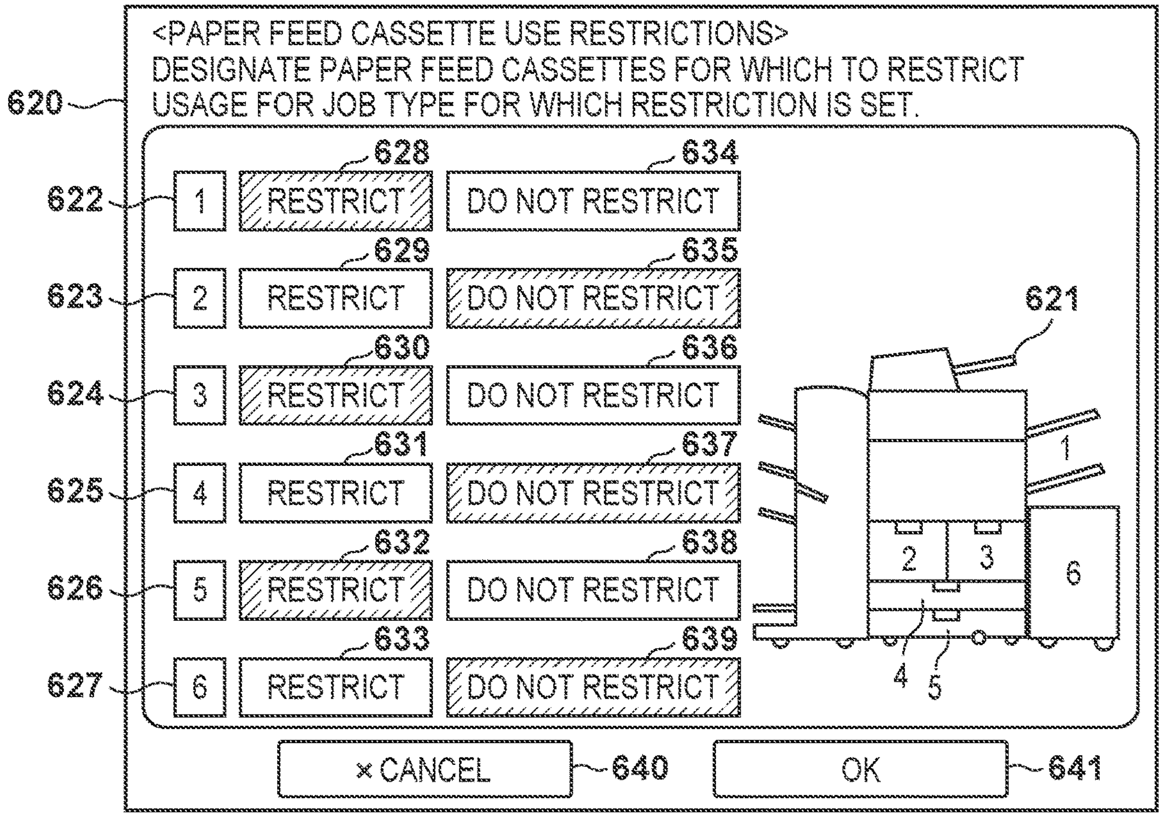

When, for example, a paper feed cassette use restriction setting button (menu) is selected from the device setting screen (not shown), the control unit 205 displays a paper feed cassette use restriction setting screen 620 shown in FIG. 6B on the operation unit 112. The paper feed cassette use restriction setting screen 620 is a screen for setting, for the print job type for which the restricted use of resources is set on the restricted print job setting screen 600 shown in FIG. 6A, whether to permit use of each paper feed cassette.

Paper feed cassette position display 621 indicates the location of each paper feed cassette. A number assigned to each paper feed cassette corresponds to a number displayed in each of paper feed cassette selection displays 622 to 627. The paper feed cassette selection displays 622 to 627 indicate that "restricted use" buttons 628 to 633 and "unrestricted use" buttons 634 to 639 are used to make settings for specific paper feed cassettes, respectively. For example, as for paper feed cassette 1, a setting is made for a "manual paper feed tray" on the right side of the printer, as indicated by the paper feed cassette position display 621. The "restricted use" button 628 and the "unrestricted use" button 634 corresponding to the paper feed cassette selection display 622 are used to make a setting.

The "restricted use" buttons 628 to 633 are buttons corresponding to the paper feed cassettes indicated by the paper feed cassette selection displays 622 to 627, respectively. A print job type for which "restricted" is set on the restricted print job setting screen 600 cannot use paper in a paper feed cassette for which "restricted use" is selected. For example, assume that the "restricted" button 606 is selected on the restricted print job setting screen 600 to set the restricted use of resources for a PostScript print job. Assume also that the "restricted use" button 628 corresponding to paper feed cassette 1 is selected to set the restricted use of the paper feed cassette. In this case, a print job for which print settings are made using PostScript cannot use paper in paper feed cassette 1. On the other hand, it is possible to designate paper feed cassette 1 in print settings on the printer driver of the information processing apparatus 102. If the image forming apparatus 101 accepts a designated print instruction from the information processing apparatus 102, a paper selection screen shown in FIG. 7 to be described later is displayed without feeding paper from paper feed cassette 1.

The "unrestricted use" buttons 634 to 639 are buttons corresponding to the paper feed cassettes indicated by the paper feed cassette selection displays 622 to 627, respectively. A print job type for which "restricted" is set on the restricted print job setting screen 600 can use paper in the paper feed cassette for which "unrestricted use" of the paper feed cassette is set. With respect to the "restricted use" buttons 628 to 633 and the "unrestricted use" buttons 634 to 639, one of the buttons corresponding to the same paper feed cassette is exclusively set in the selected state.

A cancel button 640 is a button used to discard the settings. When the cancel button 640 is selected, the selection operation performed on the paper feed cassette use restriction setting screen 620 is discarded, thereby transitioning to the screen before transition. An OK button 641 is a button used to save the settings. When the OK button 641 is selected, the current paper feed cassette use restriction settings are stored in the RAM 208 and the HDD 209, thereby transitioning to the screen before transition.

Assume that "restricted" is set for PostScript used by the printer driver and "unrestricted" is set for JDF used by the workflow application on the restricted print job setting screen 600 shown in FIG. 6A. Then, on the paper feed cassette use restriction setting screen 620, "restricted use" is set for a paper feed cassette storing paper to be used in an in-house printing operation. This can prevent paper for an in-house printing operation from being used erroneously in an office operation, without making additional settings on the application side.

Figure 6C:
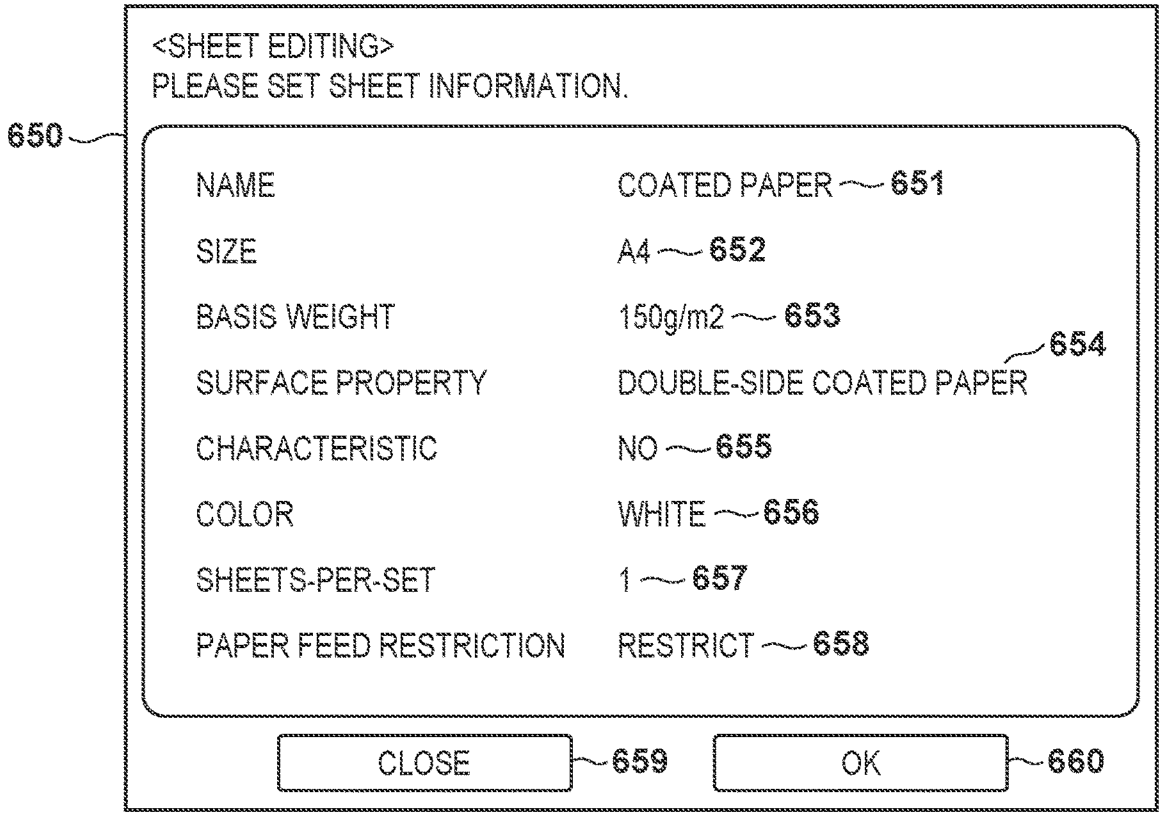

When, for example, a paper editing button (menu) is selected from the device setting screen (not shown), the control unit 205 displays a paper editing screen 650 shown in FIG. 6C on the operation unit 112. The paper editing screen 650 is a screen for making various settings concerning paper. The paper editing screen 650 exists for each paper supported by the image forming apparatus 101.

On the paper editing screen 650, various paper settings can be made. In FIG. 6C, a name setting portion 651, a size setting portion 652, a basis weight setting portion 653, a surface property setting portion 654, a characteristic setting portion 655, a color setting portion 656, a sheets-per-set setting portion 657, and a use restriction setting portion 658 are provided. The user can edit the value of each setting portion by selecting each setting portion. Furthermore, the present invention is not limited to the setting portions shown in FIG. 6C, and other setting portions may be included as long as at least the use restriction setting portion 658 is included.

The use restriction setting portion 658 is a setting portion for making a use restriction setting on paper corresponding to the paper editing screen 650. On the paper feed cassette use restriction setting screen 620, a use restriction setting is made on a paper feed cassette. In the use restriction setting portion 658, a use restriction setting can be made on paper. In the image forming apparatus 101, settings for both or one of the paper feed cassette and the paper may be provided. If settings for both of the paper feed cassette and the paper are provided, when "restricted use" is set for paper in the use restriction setting portion 658 for the paper and the paper is set in the paper feed cassette, one of the "restricted use" buttons 628 to 633 corresponding to the paper feed cassette is automatically set in the selected state. As for, for example, custom paper created by the user, "restricted use" may fixedly be set for the paper in the use restriction setting portion 658. If "unrestricted use" is set for the paper in the use restriction setting portion 658 and the paper is set in the paper feed cassette, the use restriction setting set for the paper feed cassette is applied.

A close button 659 is a button used to close the paper editing screen 650. When the close button 659 is selected, the paper editing screen 650 is closed to transition to the screen before transition. An OK button 660 is a button used to save the settings. When the OK button 660 is selected, the settings for the paper are stored in the RAM 208 and the HDD 209, thereby transitioning to the screen before transition.

Figure 6D:
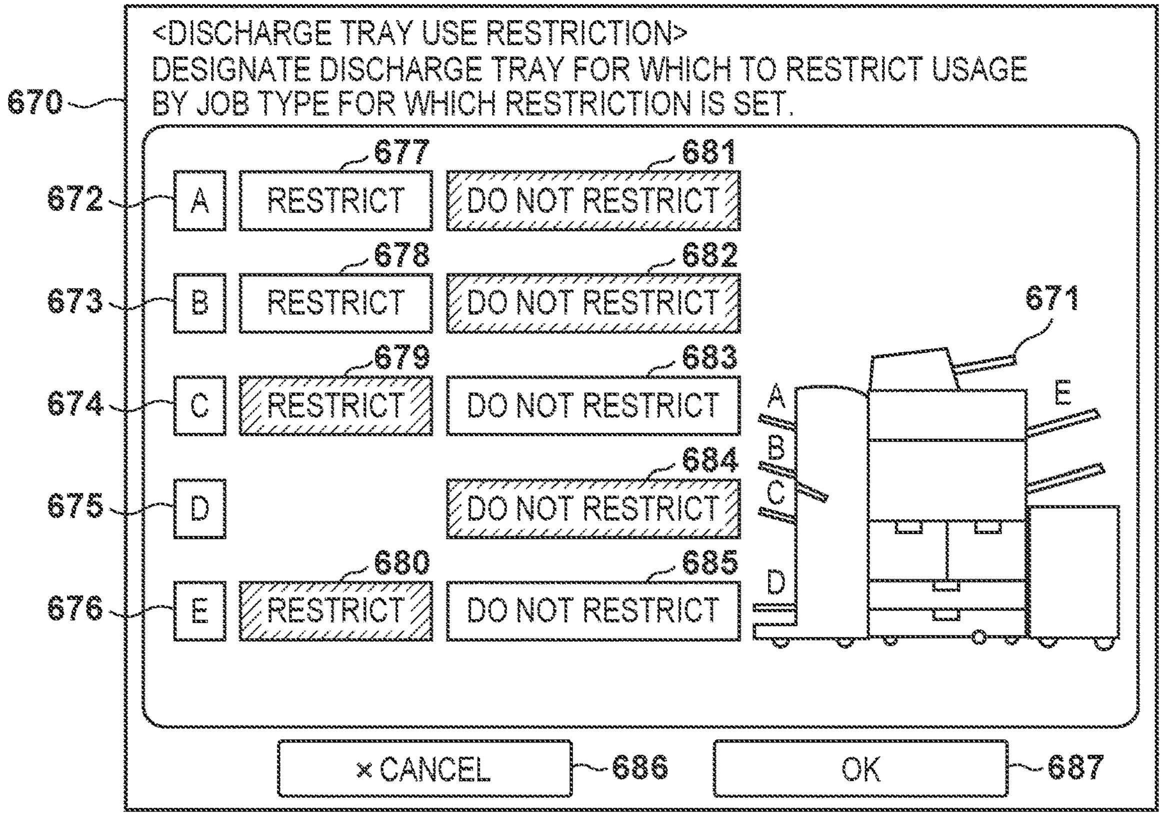

When, for example, a discharge tray use restriction button (menu) is selected from the device setting screen (not shown), the control unit 205 displays a discharge tray use restriction setting screen 670 shown in FIG. 6D on the operation unit 112. The discharge tray use restriction setting screen 670 is a screen for setting whether to permit a print job type, for which the restricted use of resources is set on the restricted print job setting screen 600 shown in FIG. 6A, to use each discharge tray.

A discharge tray position display 671 indicates the location of each discharge tray. A number assigned to each discharge tray corresponds to a number displayed in each of discharge tray selection displays 672 to 676. The discharge tray selection displays 672 to 676 indicate that "restricted use" buttons 677 to 680 and "unrestricted use" buttons 681 to 685 are used to make settings for specific discharge trays, respectively.

The "restricted use" buttons 677, 678, 679, and 680 are buttons respectively corresponding to the discharge trays indicated by the discharge tray selection displays 672, 673, 674, and 676 and each used to set the restricted use. A print job type for which "restricted" is set on the restricted print job setting screen 600 cannot discharge paper to the discharge tray for which "restricted use" is set. A "restricted use" button is not assigned to the discharge tray selection display 675 corresponding to discharge tray D. This is because discharge tray D is a saddle tray, and is a discharge tray that is always used when a function of performing saddle processing is used. If the restricted use is set for the discharge tray that is always used when such specific function is used, the function itself cannot be used. For this tray, instead of setting the restricted use, a warning message for calling attention to remove paper before executing a print job type for which the restricted use is set is displayed on the operation unit 112, thereby making it possible to prevent sheets in an in-house operation and an office operation from being mixed.

The "unrestricted use" buttons 681 to 685 are buttons respectively corresponding to the discharge trays indicated by the discharge tray selection displays 672 to 676 and each used to set "unrestricted use". A print job type for which "restricted" is set on the restricted print job setting screen 600 can discharge paper to the discharge tray for which "unrestricted use" is set by each of the "unrestricted use" buttons 681 to 685.

With respect to the "restricted use" buttons 677 to 680 and the "unrestricted use" buttons 681 to 685, one of the buttons corresponding to the same discharge tray is exclusively set in the selected state. In addition, the button corresponding to the discharge tray for which only one of buttons is provided is always set in the selected state. Assume, for example, that the "restricted" button 606 is selected on the restricted print job setting screen 600 to set the restricted use of resources for PostScript and the "restricted use" button 679 corresponding to discharge tray C is selected to set the restricted use. In this case, a print job for which print settings are made using PostScript cannot use discharge tray C. If a print job for which discharge tray C is designated on the printer driver is input, paper is discharged to a discharge tray designated, on a default discharge tray setting screen 690 shown in FIG. 6E (to be described later), by default discharge tray designation 692 of a print job type for which "restricted" is set.

Figure 6E:
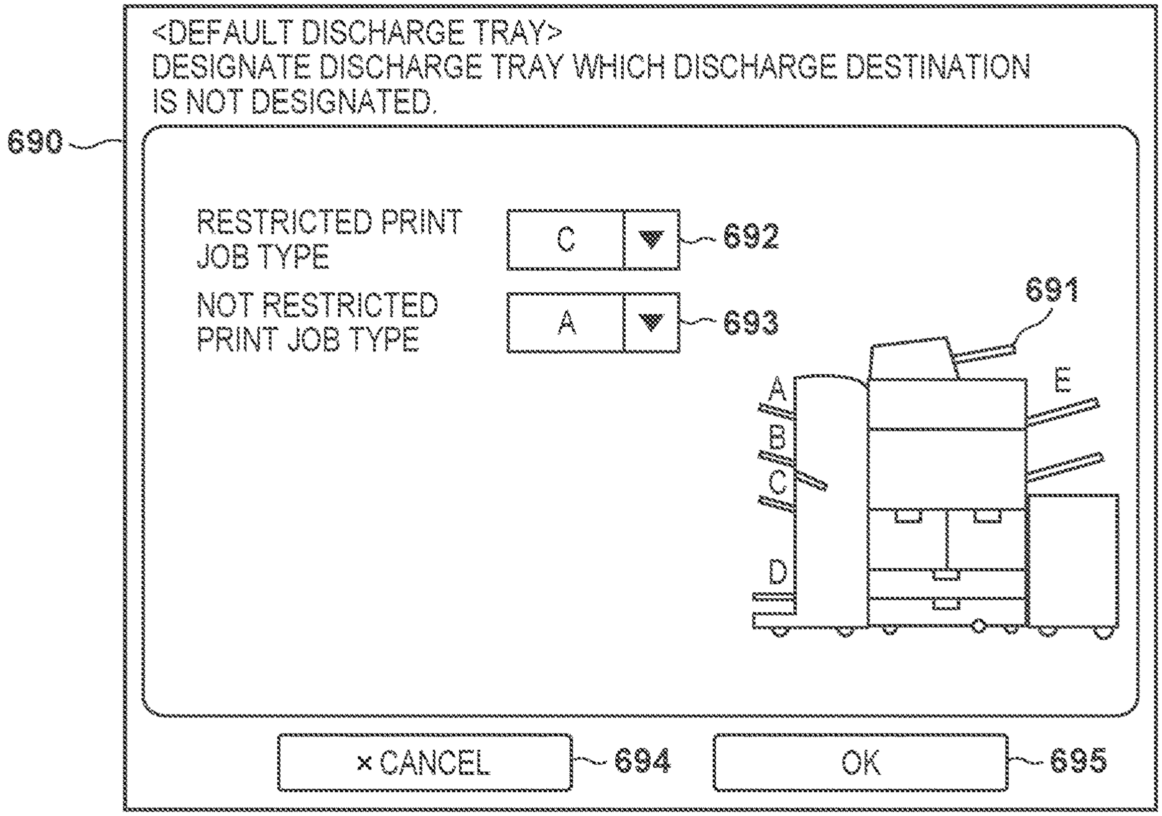

When, for example, a default discharge tray setting button (menu) is selected from the device setting screen (not shown), the control unit 205 displays the default discharge tray setting screen 690 shown in FIG. 6E on the operation unit 112. The default discharge tray setting screen 690 is a screen for designating a default discharge tray for each of a print job for which "restricted use of resources" is set on the restricted print job setting screen 600 shown in FIG. 6A and a print job for which "unrestricted" is set on the restricted print job setting screen 600. Discharge tray display 691 indicates the location of each discharge tray, and is the same as the discharge tray position display 671.

The default discharge tray designation 692 of the print job type for which "restricted" is set is a selection menu for setting the default discharge tray of the print job type for which "restricted" is set on the restricted print job setting screen 600. When the default discharge tray designation 692 of the print job type for which "restricted" is set is selected, a list of discharge trays is displayed, and the user can select a discharge tray. A discharge tray included in the discharge tray list is a discharge tray for which "unrestricted use" is set on the discharge tray use restriction setting screen 670 shown in FIG. 6D. However, discharge tray D of the discharge tray selection display 675 without the "restricted use" button is not included in the selection menu.

Default discharge tray designation 693 of the print job type for which "unrestricted" is set is a selection menu for setting the default discharge destination of the print job type for which "unrestricted" is set on the restricted print job setting screen 600. When the default discharge tray designation 693 of the print job type for which "unrestricted" is set is selected, a list of discharge trays is displayed, and the user can select a discharge tray. A discharge tray included in the discharge tray list is a discharge tray for which "restricted use" is set on the discharge tray use restriction setting screen 670 shown in FIG. 6D.

If no discharge tray is designated in the print settings of the print job type for which "unrestricted" is set, paper is discharged to the discharge tray set by the default discharge tray designation 693 of the print job type for which "unrestricted" is set. If no discharge tray is designated in the print settings of the print job type for which "restricted" is set, paper is discharged to the discharge tray set by the default discharge tray designation 692 of the print job type for which "restricted" is set.

The image forming apparatus 101 may include only the default discharge tray setting screen 690 shown in FIG. 6E without including the discharge tray use restriction setting screen 670 shown in FIG. 6D. There is a case where a discharge tray is not designated since print settings are normally, hardly changed in an office operation. For example, the selection menu of the default discharge tray designation 693 of the print job type for which "unrestricted" is set includes discharge tray D automatically decided by the function, and all discharge trays other than the discharge tray selected in the selection menu of the default discharge tray designation 692 of the print job type for which "restricted" is set. With this arrangement, in the above case, it is possible to set, as a default discharge tray in an office operation, a discharge tray different from a default discharge tray in an in-house operation, thereby preventing sheets from being mixed.

A cancel button 694 is a button used to discard the settings. When the cancel button 694 is selected, the selection operation performed on the default discharge tray setting screen 690 is discarded, thereby transitioning to the screen before transition. An OK button 695 is a button used to save the settings. When the OK button 695 is selected, the current default discharge tray settings are stored in the RAM 208 and the HDD 209, thereby transitioning to the screen before transition.

Assume that a print job for which the restricted use of resources is set for a print job type on the restricted print job setting screen 600 and for which a paper feed cassette set with "restricted use" on the paper feed cassette use restriction setting screen 620 is designated is printed. Alternatively, assume that a print job for which the restricted use of resources is set for a print job type on the restricted print job setting screen 600 and for which paper set with "restricted use" in the use restriction setting portion 658 on the paper editing screen 650 is designated is printed. At this time, the control unit 205 displays a paper selection screen 700 shown in FIG. 7 on the operation unit 112.

Paper feed cassette position display 701 is the same as the paper feed cassette position display 621. A designated paper display portion 702 displays paper designated by a print job. Each of paper feed cassette selection buttons 703 to 708 is a button used to select paper to be used for printing. The paper feed cassette selection buttons 703, 705, and 707 respectively correspond to paper feed cassettes for which "restricted use" is set on the paper feed cassette use restriction setting screen 620. The button of the paper feed cassette for which restricted use is set is grayed out and cannot accept selection. Restriction marks 709, 710, and 711 are displayed to indicate the reason for which selection cannot be accepted. Since restricted use is not set for paper feed cassette 4 but the size does not match the size of paper designated by a print job, the paper feed cassette selection button 706 of paper feed cassette 4 is displayed not to be selected. Note that if the button cannot be selected for a reason other than the reason that restricted use is set, the restriction mark is not displayed. The paper feed cassette selection buttons 703 to 708 are set in the selected state when the user selects them. One of these buttons is exclusively set in the selected state. In a state in which one of the buttons is in the selected state, if another button is selected, this button is set in the selected state.

A close button 712 is a button used to end paper selection without selecting paper. When the close button 712 is selected, the screen transitions to the screen before transition. Since no paper is selected, printing cannot be continued. It is necessary to select and cancel the print job on a print job type selection screen (not shown) or to select paper to continue printing. An OK button 713 is a button used to end paper selection by selecting paper. The OK button 713 is selectable only when one of the paper feed cassette selection buttons 703 to 708 is in the selected state. When the OK button 713 is selected, paper to be used for printing is changed to the paper in the paper feed cassette of the paper feed cassette selection button in the selected state, thereby continuing printing.

An operation instruction display portion 714 is a region where a message indicating a necessary operation is displayed to the user. For example, if a print job for which the restricted use of resources is set and for which paper for which "restricted use" is set is designated, a message indicating that paper for which "restricted use" is set is designated and that it is necessary to select another paper is displayed.

Figure 14:
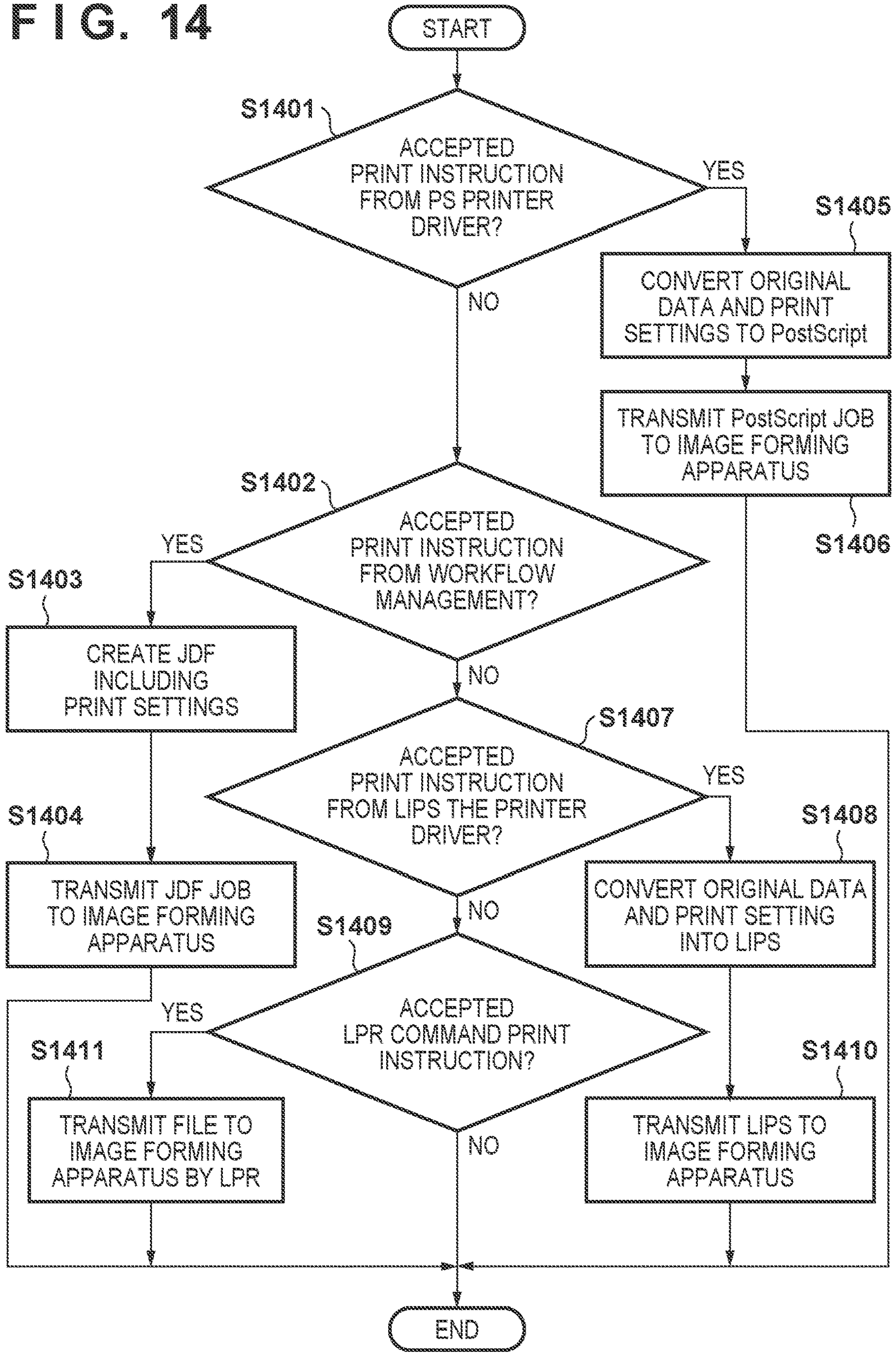
FIG. 14 is a flowchart illustrating processing executed by the information processing apparatus.

FIG. 14 is a flowchart illustrating processing executed by the CPU 401 of the information processing apparatus 102 when an operation is accepted from the user via the KB 409 or the like. The processing shown in FIG. 14 is implemented when, for example, the CPU 401 reads out a program stored in the ROM 403 and executes it.

In step S1401, the CPU 401 determines whether the accepted operation is a print instruction by the PS printer driver program 504. A print instruction by the PS printer driver program 504 is input by selecting a print button on a PS printer driver operation screen (not shown). If it is determined that the accepted operation is a print instruction by the PS printer driver program 504, the process advances to step S1405; otherwise, the process advances to step S1402.

In step S1402, the CPU 401 determines whether the accepted operation is a print instruction by the workflow management program 505. A print instruction by the workflow management program 505 is input by selecting the image forming apparatus 101 registered on a workflow management screen (not shown) and a print job to be printed, and selecting a print button. If it is determined that the accepted operation is a print instruction by the workflow management program 505, the process advances to step S1403; otherwise, the process advances to step S1407.

In step S1403, the CPU 401 creates JDF data including the print settings designated on the screen of the workflow management program 505. Various print designations are possible for the JDF data. Print designation of the JDF data will be described with reference to FIGS. 10A and 10B. After the JDF data is created, the process advances to step S1404.

In step S1404, the CPU 401 transmits, as print data, the JDF data created in step S1403, predetermined print instruction JMF data, and original data assigned to the print job to the selected image forming apparatus 101. When registering the image forming apparatus 101, the workflow management program 505 causes the user to designate an IP address and destination port at which the image forming apparatus 101 accepts the JDF data, and stores them in the HDD 411 or the RAM 402. After transmitting the print data including the JDF data, the processing shown in FIG. 14 ends.

In step S1405, the CPU 401 converts the designated original data and the print settings designated on the screen of the PS printer driver program 504 into PostScript data. The PostScript data is formed by including the print settings and the original data in one file, unlike the JDF data. The PostScript data created by the printer driver is different for each kind of image forming apparatus 101. Since the PS printer driver program 504 is a program dedicated to the image forming apparatus 101, it is possible to create appropriate PostScript data. After creating the PostScript data, the process advances to step S1406. Print designation of the PostScript data will be described with reference to FIGS. 10A and 10B.

In step S1406, the CPU 401 transmits, as print data, the PostScript data created in step S1405 to the image forming apparatus 101 at the predetermined destination port. The PS printer driver program 504 causes the user to designate the IP address of the image forming apparatus 101 at the time of installation, and stores it in the HDD 411 or the RAM 402. Since the PS printer driver program 504 is an application dedicated to the image forming apparatus 101, the program internally holds the destination port, and the user need not input it. After transmitting the print data including the PostScript data, the processing shown in FIG. 14 ends.

In step S1407, the CPU 401 determines whether the accepted operation is a print instruction by the LIPS printer driver program 506. A print instruction by the LIPS printer driver program 506 is input by selecting a print button on a LIPS printer driver operation screen (not shown). If it is determined that the accepted operation is a print instruction by the LIPS printer driver program 506, the process advances to step S1408; otherwise, the process advances to step S1409.

In step S1408, the CPU 401 converts the designated original data and the print settings on the screen of the LIPS printer driver program 506 into LIPS data. The LIPS data is formed by including the print settings and the original data in one file, like the PostScript data. After creating the LIPS data, the process advances to step S1410.

In step S1410, the CPU 401 transmits, as print data, the LIPS data created in step S1408 to the image forming apparatus 101 at the predetermined destination port. The LIPS printer driver program 506 causes the user to designate the IP address of the image forming apparatus 101 at the time of installation, and stores it in the HDD 411 or the RAM 402. Since the LIPS printer driver program 506 is an application dedicated to the image forming apparatus 101, the program internally holds the destination port, and the user need not input it. After the image forming apparatus 101 transmits the print data including the LIPS data, the processing shown in FIG. 14 ends.

In step S1409, the CPU 401 determines whether the accepted operation is a print instruction by an LPR command. If it is determined that the accepted operation is a print instruction by an LPR command, the process advances to step S1411; otherwise, the processing shown in FIG. 14 ends.

In step S1411, the CPU 401 transmits the designated original file as print data to the image forming apparatus 101 by the LPR protocol. The LPR command sets port 515 as the destination port. The LPR command transmits the designated original file intact.

After transmitting the print data including the original file, the processing shown in FIG. 14 ends.

Figure 8:
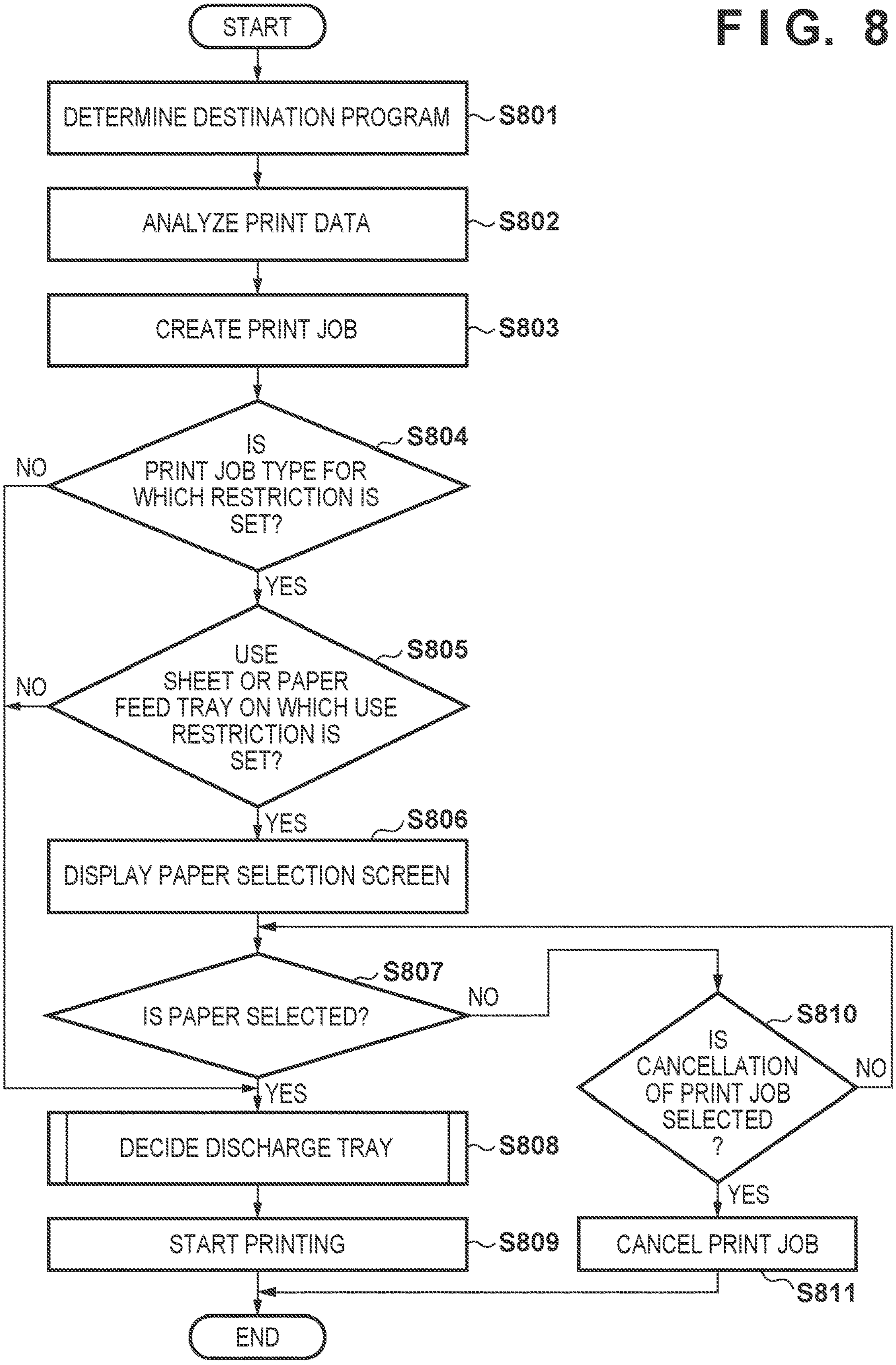
FIG. 8 is a flowchart illustrating processing executed by the image forming apparatus.

FIG. 8 is a flowchart illustrating processing when the control unit 205 of the image forming apparatus 101 accepts a print job via the external I/F 210. The processing shown in FIG. 8 is implemented when, for example, the CPU of the control unit 205 reads out a program stored in the ROM 207 into the RAM 208, and executes it.

In step S801, the control unit 205 determines the destination program of the received data. As described above, since the destination port is different for each print job type, the destination program can be determined based on the destination port. In this example, assume that the destination port is assigned to each print job type, as shown in FIG. 15. With reference to the destination port stored in the header of the received data, the network control program 303 determines the destination program that processes the data. If, for example, the destination port is 8080, the network control program 303 transfers the received data to the JDF analysis program 306. Similarly, if the destination port is 9100, the network control program 303 transfers the received data to the PostScript data analysis program 305. If the destination port is 9200, the network control program 303 transfers the received data to the LIPS data analysis program 309. If the destination port is 515, the network control program 303 transfers the received data to the PDF data analysis program 307. After transferring the data to the destination program, the process advances to step S802.

In step S802, the control unit 205 analyzes the data by the analysis program that has accepted the data. Note that it is unnecessary to analyze all the data at this time, and it is only necessary to analyze a necessary part of the data to create a print job. After the analysis processing, the process advances to step S803.

In step S803, the control unit 205 creates a print job by the print control program 304. A print job is created based on a print job type corresponding to the program that has analyzed the data. For example, in the case of the PostScript data analysis program 305, a PostScript print job is created. In the case of the JDF analysis program 306, a JDF print job is created. In the case of the LIPS data analysis program 309, a LIPS print job is created. In the case of the PDF data analysis program 307, a direct printing print job is created. Note that if not all the print data has been analyzed in step S802, the print data is sequentially analyzed in accordance with an instruction of the print control program 304. After creating the print job, the process advances to step S804.

In step S804, the control unit 205 refers to the restricted print job settings stored in the RAM 208. The restricted print job settings are information set on the restricted print job setting screen 600 shown in FIG. 6A. Then, the control unit 205 determines whether the print job to be executed is of a print job type for which "restricted" is set. If it is determined that the print job is of a print job type for which "restricted" is set, the process advances to step S805; otherwise, the process advances to step S808.

In step S805, the control unit 205 refers to paper designation included in the result of the analysis processing in step S802, the use restriction settings of the paper feed trays/paper stored in the RAM 208, and paper information of the paper feed tray managed by the medium management program 308. The use restriction settings of the paper feed trays are information set on the paper feed cassette use restriction setting screen 620 shown in FIG. 6B. The use restriction setting of the paper is information set on the paper editing screen 650 shown in FIG. 6C. Then, the control unit 205 determines whether the condition that "the paper designated by the print job is the paper in the paper feed tray for which "restricted" is set or the paper for which "restricted use" is set in the use restriction setting portion 658" is satisfied. If it is determined that the condition is satisfied, the process advances to step S806; otherwise, the process advances to step S808.

Figure 7:
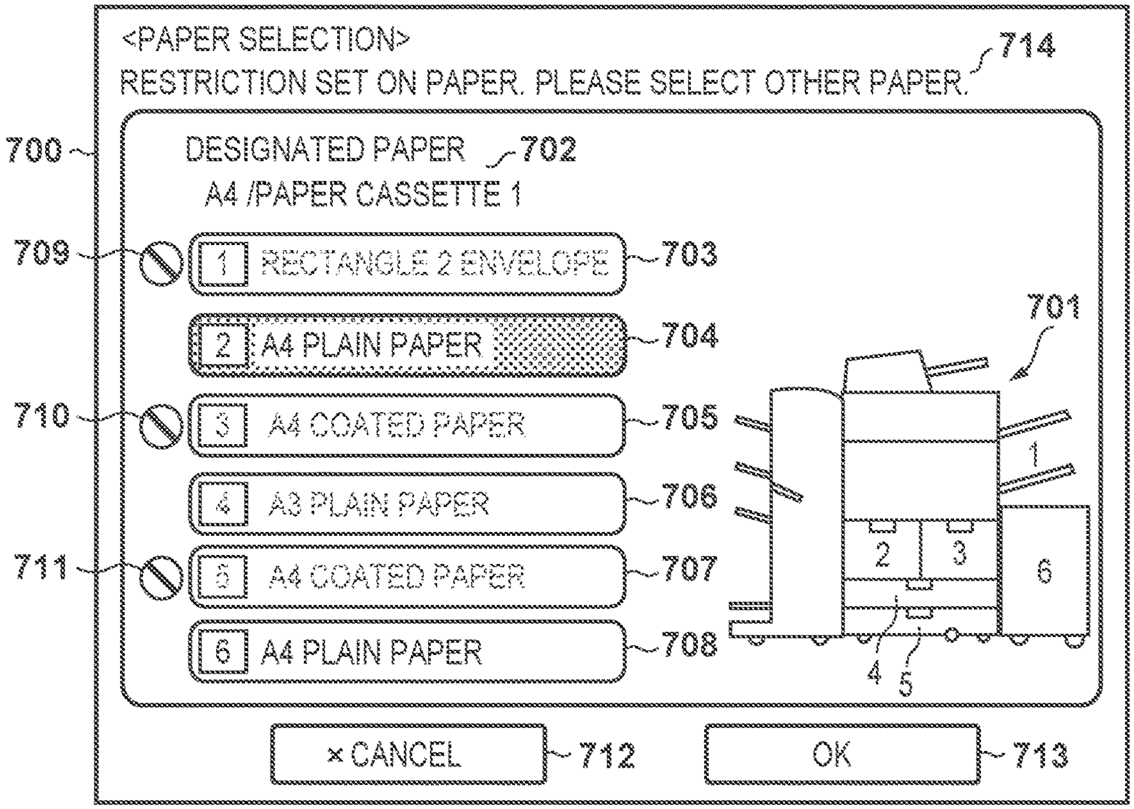
FIG. 7 is a view showing a user interface screen displayed by the image forming apparatus.

In step S806, the control unit 205 displays the paper selection screen 700 shown in FIG. 7 on the operation unit 112. After that, the process advances to step S807. In step S807, the control unit 205 determines whether the paper is selected on the paper selection screen 700. If it is determined that the paper is selected, the process advances to step S808; otherwise, the process advances to step S810.

In step S808, the control unit 205 performs discharge tray decision processing. The discharge tray decision processing will be described with reference to FIG. 9. After the discharge tray is decided, the process advances to step S809. In step S809, the control unit 205 starts printing. In printing, the paper analyzed in step S802 or the paper selected on the paper selection screen 700 is used and discharged to the discharge tray decided in step S808. After printing ends, the processing shown in FIG. 8 ends.

In step S810, the control unit 205 determines whether a job cancel operation is performed on a print job display screen (not shown). If it is determined that a job cancel operation is performed, the process advances to step S811; otherwise, the processes from step S807 are repeated. In step S811, the control unit 205 cancels the print job. The print control program 304 stops printing of the interrupted print job, and deletes it. After canceling the print job, the processing shown in FIG. 8 ends.

FIG. 15 is a table showing an example of a correspondence table 1500 between the destination port and the program determined by the image forming apparatus 101. The network control program 303 refers to the destination port of the received data in the correspondence table 1500 to decide the program to which the data is to be transferred.

A destination port 1501 indicates a port number for designating the program as the transfer destination of the data. The correspondence table 1500 stores only a port number to which a destination program 1502 is assigned, and does not store a port number to which no destination program 1502 is assigned.

The destination program 1502 indicates a program that processes the data. When data with the matching destination port is received, the network control program 303 transfers the data to the corresponding destination program 1502.

A destination port 1503 is associated with the JDF analysis program 306. A destination port 1504 is associated with the PostScript data analysis program 305. A destination port 1505 is associated with the LIPS data analysis program 309.

A destination port 1506 is associated with the PDF data analysis program 307. Each program designates the corresponding destination port at the time of activation. The network control program 303 stores the designated destination port in the correspondence table 1500, refers to, when data is received, the destination port designated by the data in the correspondence table 1500, and transfers the received data to the corresponding program.

Figure 9:
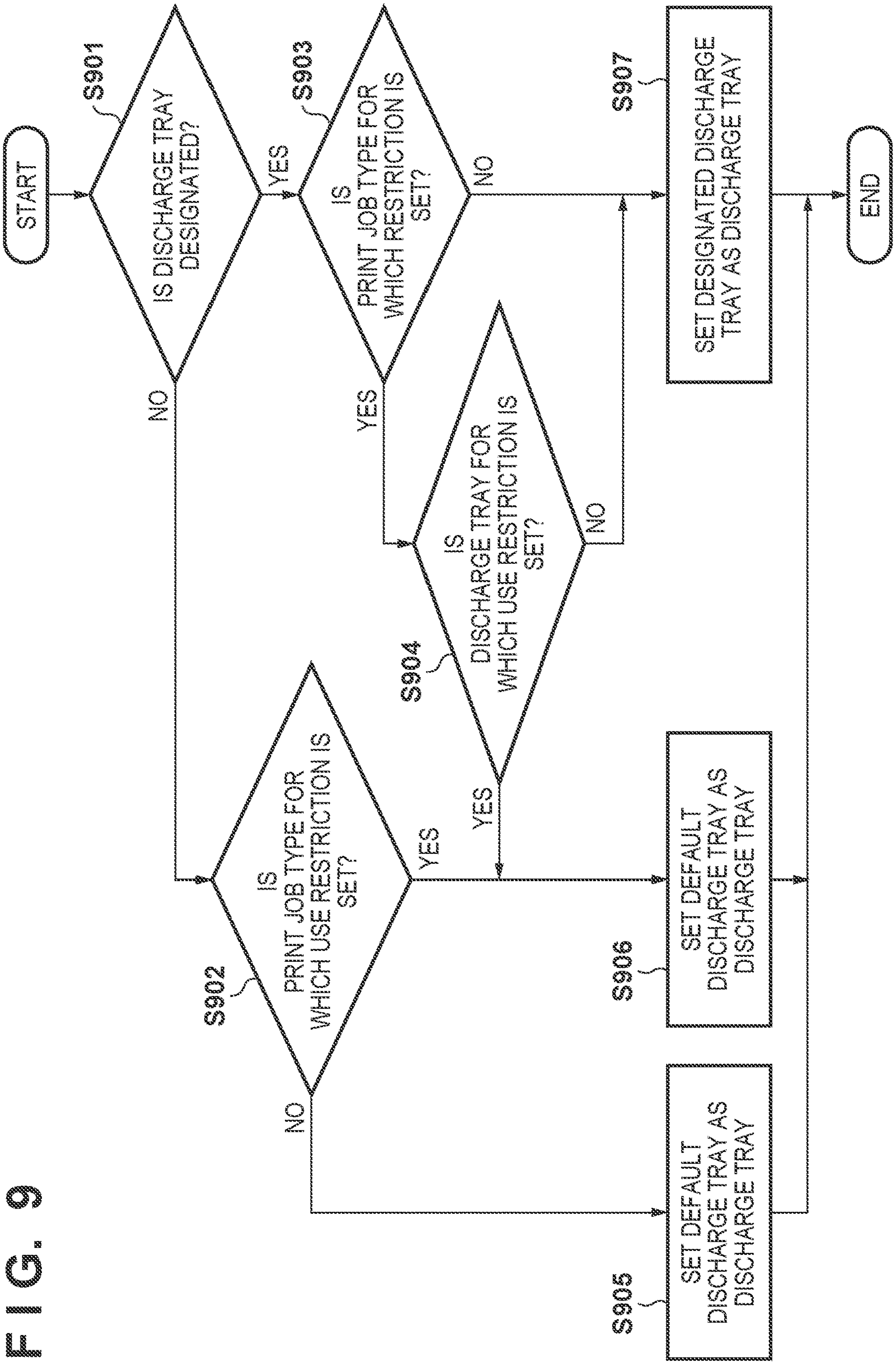
FIG. 9 is a flowchart illustrating processing executed by the image forming apparatus.

FIG. 9 is a flowchart illustrating the discharge tray decision processing executed by the control unit 205 in step S808. In step S901, the control unit 205 determines whether the discharge tray is designated in the print data analyzed in step S802. If it is determined that the discharge tray is designated, the process advances to step S903; otherwise, the process advances to step S902.

In step S902, the control unit 205 refers to the restricted print job settings stored in the RAM 208. The restricted print job settings are information set on the restricted print job setting screen 600 shown in FIG. 6A. The control unit 205 determines whether the accepted print job is of a print job type for which "restricted" is set. If it is determined that the print job is of a print job type for which "restricted" is set, the process advances to step S906; otherwise, the process advances to step S905.

In step S905, the control unit 205 refers to the default discharge tray setting. The default discharge tray setting is information set on the default discharge tray setting screen 690 shown in FIG. 6E. The control unit 205 decides, as the discharge tray to be used, the discharge tray set by the default discharge tray designation 693 of the print job type for which "unrestricted" is set. After that, the processing shown in FIG. 9 ends.

In step S906, the control unit 205 refers to the default discharge tray setting. The default discharge tray setting is information set on the default discharge tray setting screen 690 shown in FIG. 6E. The control unit 205 decides, as the discharge tray to be used, the discharge tray set by the default discharge tray designation 692 of the print job type for which "restricted" is set. After that, the processing shown in FIG. 9 ends.

In this embodiment, with the above-described arrangement, if the discharge tray is not designated, the discharge tray can be made different between the print job type for which "restricted" is set and the print job type for which "restricted" is not set.

In step S903, the control unit 205 refers to the restricted print job settings stored in the RAM 208. The restricted print job settings are information set on the restricted print job setting screen 600 shown in FIG. 6A. The control unit 205 determines whether the accepted print job is of a print job type for which "restricted" is set. If it is determined that the print job is of a print job type for which "restricted" is set, the process advances to step S904; otherwise, the process advances to step S907.

In step S904, the control unit 205 refers to the discharge tray use restriction settings stored in the RAM 208. The restricted print job settings are information set on the discharge tray use restriction setting screen 670 shown in FIG. 6D. The control unit 205 determines whether the discharge tray designated by the print job is a discharge tray for which "restricted use" is set. If it is determined that the discharge tray is a discharge tray for which "restricted use" is set, the process advances to step S906; otherwise, the process advances to step S907.

In this embodiment, with the above-described arrangement, it is possible to prevent use of the discharge tray for which "restricted use" is set when the print job is of a print job type for which "restricted" is set.

In step S907, the control unit 205 decides, as the discharge tray to be used, the discharge tray designated by the accepted print job. After that, the processing shown in FIG. 9 ends.

Figure 10A:
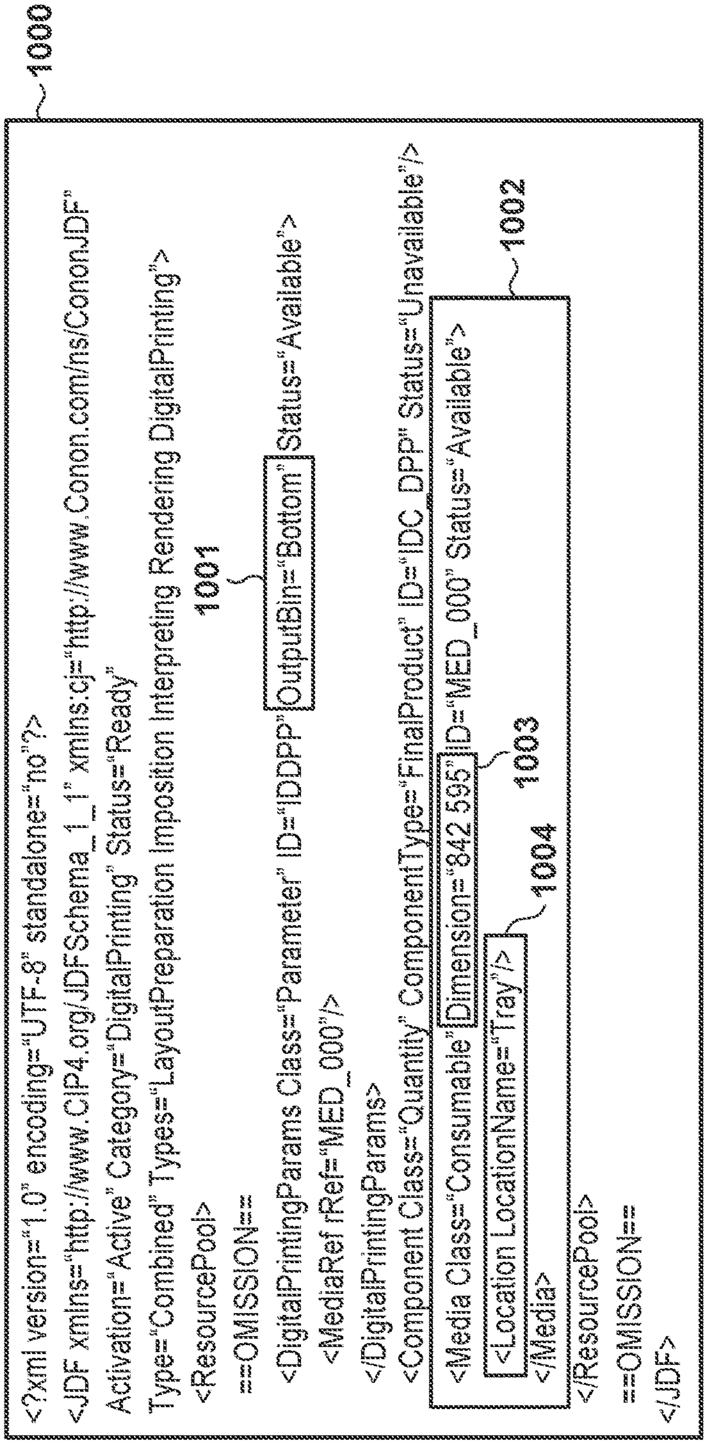
FIGS. 10A and 10B are views each for explaining a job.

FIG. 10A is a view showing an example of JDF 1000 in which paper designation and discharge tray designation are performed. In JDF, many settings can be made but only associated items will be described.

A JDF discharge tray designation portion 1001 is a portion where a command for designating a discharge tray is described. Since a value that can be designated in the JDF discharge tray designation portion 1001 can be acquired by using JMF, the workflow application need not individually cope with each image forming apparatus. The workflow application need only acquire the discharge tray using JMF so as to select the acquired value on the job setting screen.

If the JDF discharge tray designation portion 1001 is not designated, it is determined in step S901 of FIG. 9 that no discharge tray is designated.

A JDF paper designation portion 1002 is a portion where a command for designating paper is described.

In JDF, there are various paper designation methods. The example explained here is an example in a case where a JDF paper size designation portion 1003 and a paper feed tray designation portion 1004 are used to designate paper. However, paper may be designated by another designation method. The JDF paper size designation portion 1003 is a portion where a command for designating a paper size is described. In JDF, the size is designated by a point value. In the example shown in FIG. 10A, the A4 size is designated.

The paper feed tray designation portion 1004 is a portion where a command for designating, by a paper feed tray, paper to be used is described. Since a value that can be designated in the paper feed tray designation portion 1004 can be acquired by using JMF, the workflow application need not individually cope with each image forming apparatus. The workflow application need only acquire the paper feed tray using JMF so as to select the acquired value on the job setting screen.

Figure 10B:
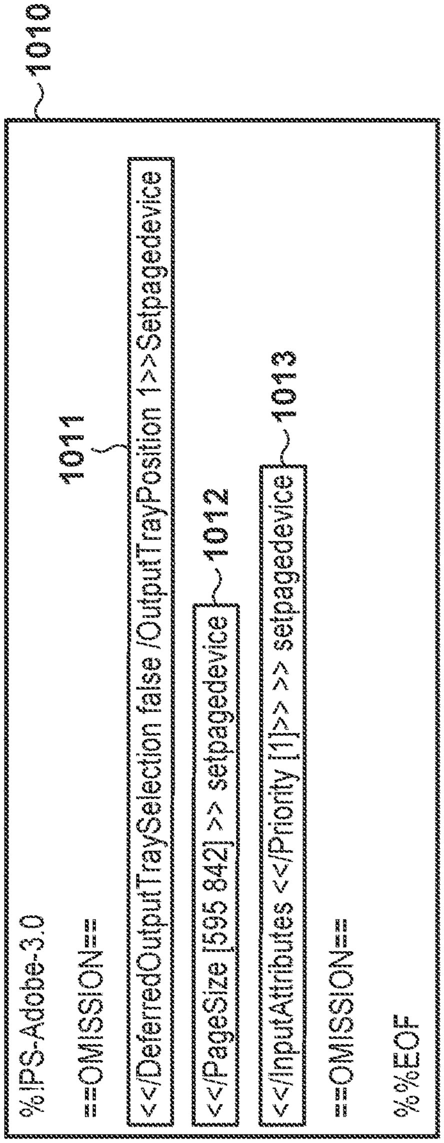

FIG. 10B is a view showing an example of PostScript 1010 in which paper designation and discharge tray designation are performed. Since PostScript includes image data, it includes many pieces of information but only associated items will be described.

A PostScript discharge tray designation portion 1011 is a portion where a command for designating, by a discharge tray, paper to be used is described. Unlike JDF, PostScript has no method of obtaining information of the image forming apparatus from the image forming apparatus. Therefore, it is necessary to acquire the arrangement information of the image forming apparatus by another method held by the image forming apparatus, and determine attached discharge trays. Furthermore, since it is necessary to separately hold a designation value for a discharge tray in a table or the like, an application that inputs a print job needs to individually cope with each image forming apparatus. Therefore, PostScript is often used by a printer driver prepared by a printer vendor or the like, and is not used by the workflow application.

A PostScript paper size designation portion 1012 is a portion where a command for designating a paper size is described. In PostScript, a size is designated by a point value. In the example shown in FIG. 10B, the A4 size is designated. A PostScript paper feed tray designation portion 1013 is a portion where a command for designating a paper feed tray is described. Similar to the discharge tray, an application that inputs a print job needs to individually cope with each image forming apparatus.

As described above, according to this embodiment, for example, "unrestricted" is set for a print job type used by the workflow application and "restricted" is set for a print job type used by the printer driver. Then, "restricted use" is set for a paper feed cassette storing paper to be used only in an in-house printing operation. As a result, it is possible to prevent use of expensive paper for an in-house printing operation by an employee who performs only an office operation. In addition, since, in an in-house printing operation, paper is discharged to a discharge tray different from that for an office operation, it is possible to prevent the paper from being taken away by an employee who performs an office operation. It is unnecessary to make changes on the workflow application side. Therefore, it is possible to use a commercial workflow application without any change.

In FIG. 6A, "restricted" or "unrestricted" is set for each print job type. These settings may be used for processing other than print processing. For example, for each of a print job type for which "restricted" is set and a print job type for which "unrestricted" is set, the number of print sheets and ink consumption may be totaled. This can perform cost management for each operation.

Furthermore, the print job received from the information processing apparatus 102 may include information indicating whether to permit use of a paper feed tray or paper for which "restricted use" is set. Then, in step S805 of FIG. 8, the control unit 205 may refer to the information. If the information indicates that the use is permitted, even if the print job is of a print job type for which "restricted" is set, the paper feed tray or paper for which "restricted use" is set can be used. That is, it may be determined in step S805 that the condition is not satisfied.

With this arrangement, control for each print job can be implemented.

Second Embodiment

The second embodiment will be described below concerning points different from the first embodiment. The second embodiment will describe a case where upon receiving a print job, an image forming apparatus 101 executes a stored print function of performing authentication and the like and then starting printing. The stored print function is executed for the purpose of, for example, repeat printing.

Figure 11:
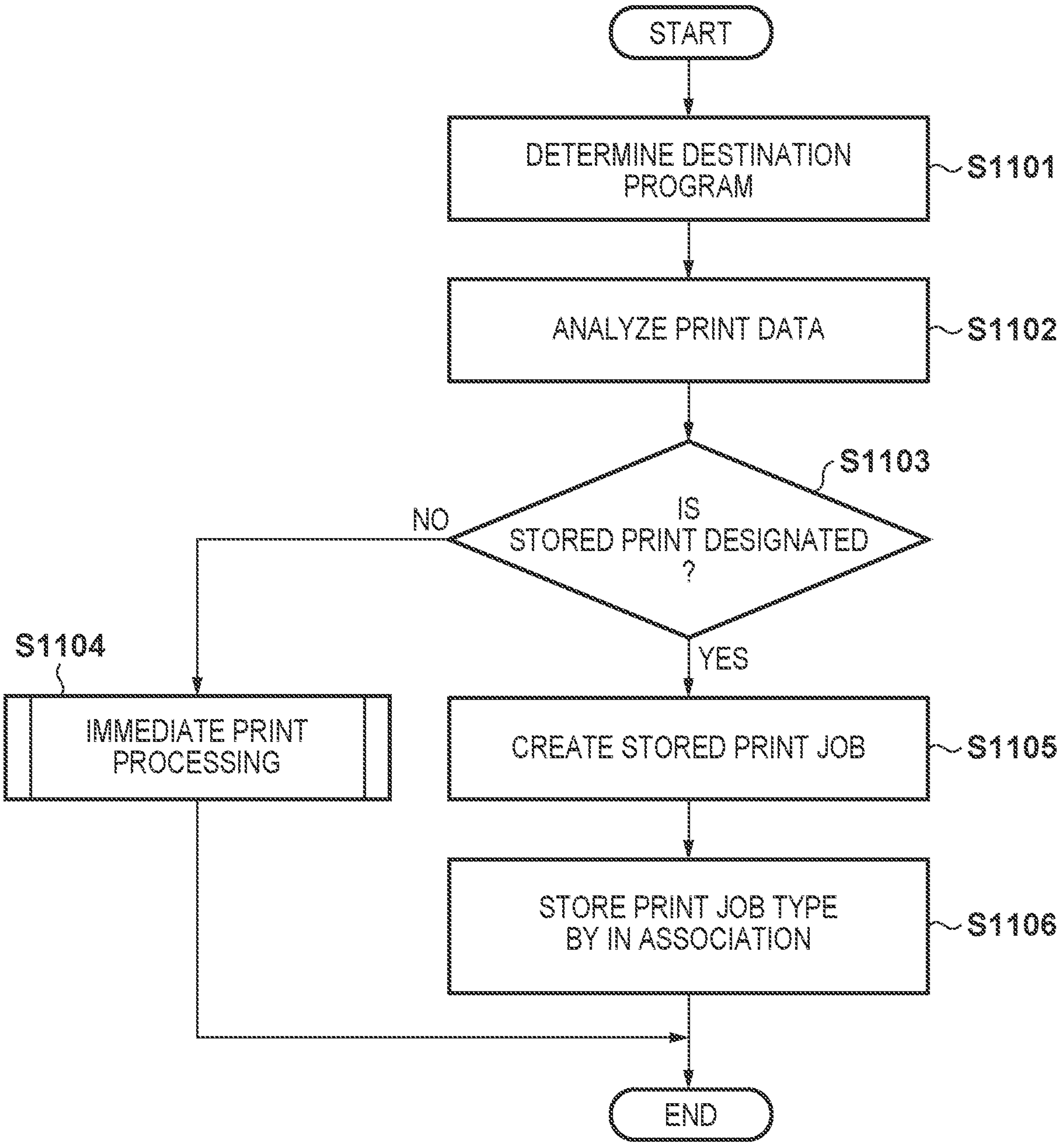
FIG. 11 is a flowchart illustrating processing executed by an image forming apparatus.

FIG. 11 is a flowchart illustrating processing when a control unit 205 receives a print job via an external I/F 210. The processing shown in FIG. 11 is implemented when, for example, the CPU of the control unit 205 reads out a program stored in a ROM 207 into a RAM 208, and executes it. In the processing shown in FIG. 11, it is determined whether to print the received print job or store the received print job for stored print, and if it is determined to store the print job, the print job is stored in association with a print job type.

Steps S1101 and S1102 are the same as steps S801 and S802 of FIG. 8 and a description thereof will be omitted. Note that if stored print can be designated by the print job, data analyzed in step S1102 includes a portion where it is designated whether the data is a stored print job. After the analysis processing, the process advances to step S1103.

In step S1103, the control unit 205 determines whether stored print is designated by the received print job. As a stored print designation method, various methods can be applied. If the image forming apparatus 101 forcibly stores a print job for stored print, it may be set to store all print jobs for stored print on a forcible storage setting screen (not shown). Setting information on the forcible storage setting screen is stored in the RAM 208. The control unit 205 acquires the setting stored in the RAM 208 at the time of receiving the print job, and determines, if it is set to store all print jobs for stored print, that stored print is designated. Based on the portion where it is designated whether the data is a stored print job, it may be determined, for each print job, whether stored print is designated. If it is determined in step S1103 that stored print is designated, the process advances to step S1105; otherwise, the process advances to step S1104. In step S1104, immediate print processing is performed. In step S1104, for example, the processes from step S803 of FIG. 8 are executed. After step S1104, the processing shown in FIG. 11 ends.

In step S1105, the control unit 205 creates a stored print job. In the processing in step S1105, a general method of creating a stored print job may be used. When storing a stored print job, print data may be analyzed and then stored, or print data may directly be stored. The control unit 205 stores the print data after analysis or the print data before analysis in an HDD 209. After creating the stored print job, the process advances to step S1106.

In step S1106, the control unit 205 stores a print job type corresponding to a destination program determined in step S1101 in the HDD 209 in association with the stored print job created in step S1105. After that, the processing shown in FIG. 11 ends.

Figure 12:
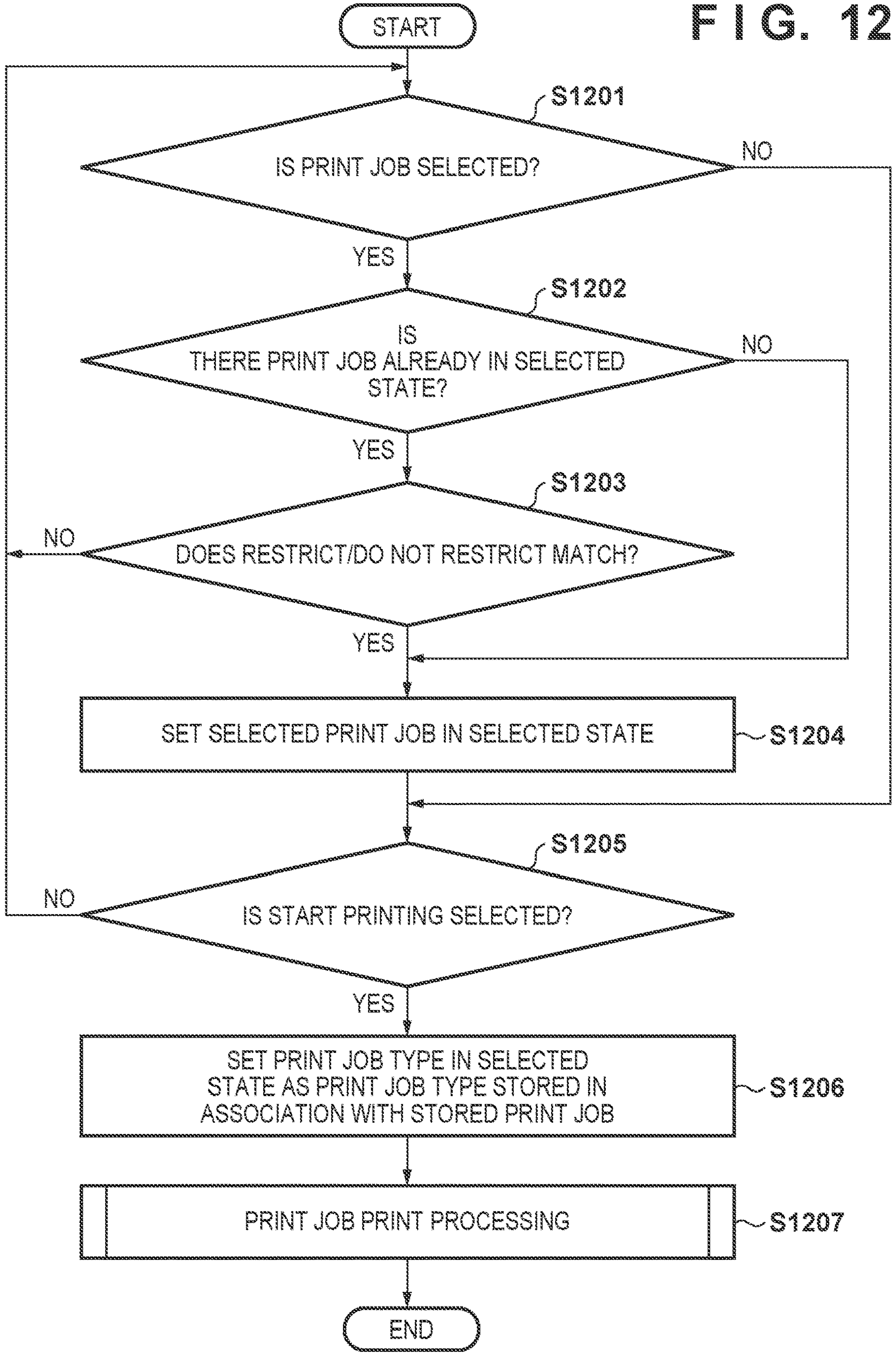
FIG. 12 is a flowchart illustrating processing executed by the image forming apparatus.
Figure 13:
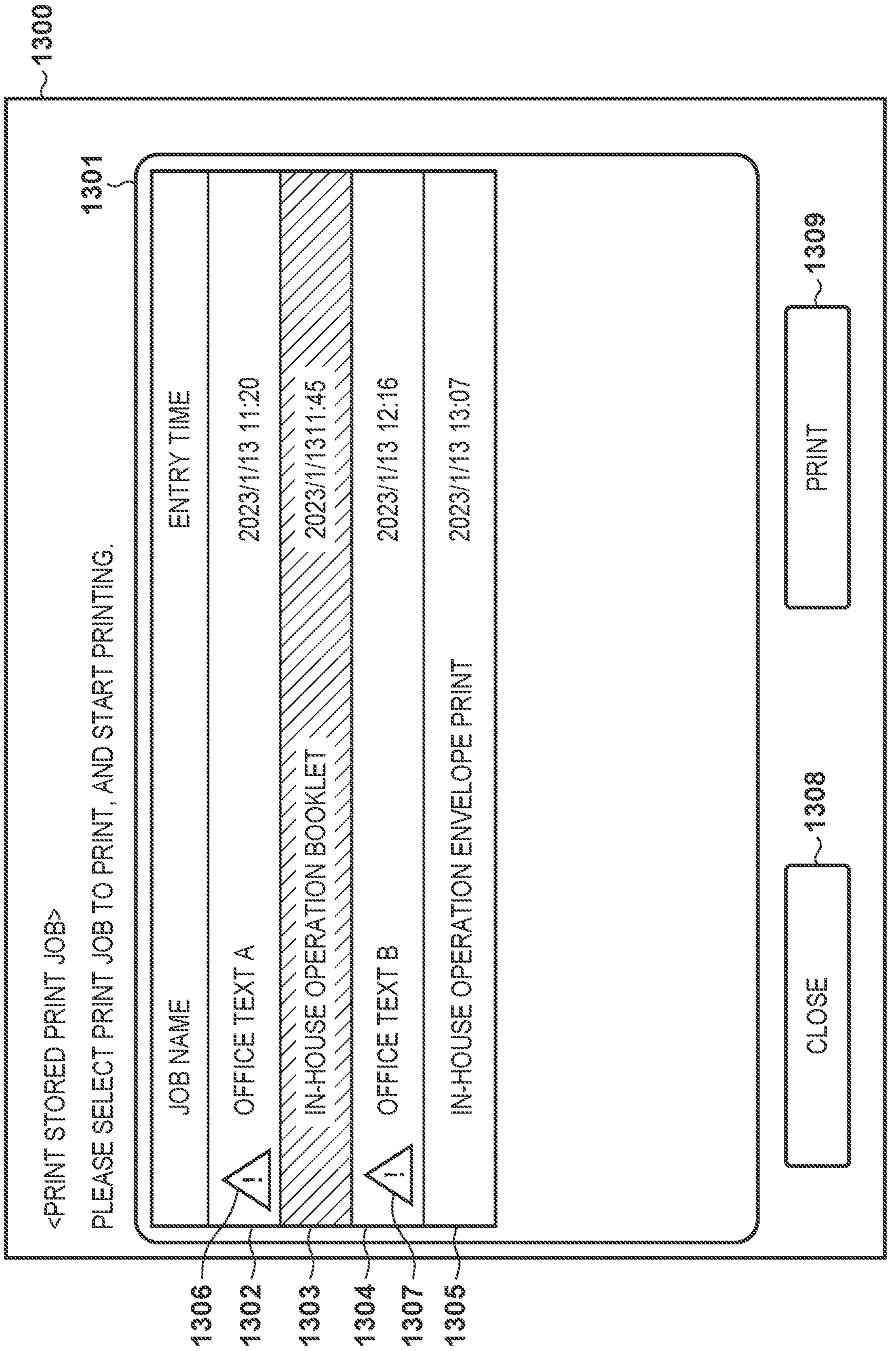
FIG. 13 is a view showing a user interface screen displayed by the image forming apparatus.

FIG. 12 is a flowchart illustrating processing of the control unit 205 when accepting an operation of printing a stored print job. The processing shown in FIG. 12 is implemented when, for example, the CPU of the control unit 205 reads out a program stored in the ROM 207 into the RAM 208, and executes it. When a stored print job print designation screen 1300 shown in FIG. 13 is displayed, the processing shown in FIG. 12 is started.

In step S1201, the control unit 205 determines whether an operation of selecting a stored print job from a stored print job list is accepted. The selection operation will be described with reference to FIG. 13. If it is determined that the selection operation is accepted, the process advances to step S1202; otherwise, the process advances to step S1205. Note that when the process advances to step S1202, the stored print job is not set in a selected state on the stored print job print designation screen 1300. The selected state indicates, for example, a state in which the user can recognize the selection, such as a change in display.

In step S1202, the control unit 205 determines whether the stored print job list includes a stored print job already set in the selected state. If it is determined that a stored print job in the selected state is included, the process advances to step S1203; otherwise, the process advances to step S1204.

In step S1203, the control unit 205 refers to the restricted print job settings stored in the RAM 208. The restricted print job settings are information set on a restricted print job setting screen 600 shown in FIG. 6A. Then, the control unit 205 determines whether a condition that ""restricted" or "unrestricted" is set for both the print job type stored in association with the stored print job selected in step S1201 and the print job type of the print job already set in the selected state" is satisfied. If it is determined that the condition is satisfied, the process advances to step S1204; otherwise, the processes from step S1201 are repeated. The determination processing in step S1203 is performed based on the print job type stored in association with the stored print job in step S1106.

In step S1204, the control unit 205 sets, in the selected state, the stored print job for which the selection operation has been accepted in step S1201. After setting the stored print job in the selected state, the process advances to step S1205. In step S1205, the control unit 205 determines whether a print start is selected. The print start selection operation will be described with reference to FIG. 13. If it is determined that a print start is selected, the process advances to step S1206; otherwise, the processes from step S1201 are repeated.

In step S1206, the control unit 205 sets, as the print job type stored in association with the stored print job in step S1106, the print job type of the print job in the selected state. After that, the process advances to step S1207.

In step S1207, the control unit 205 performs print job print processing. The print job print processing is the same as that described with reference to FIGS. 8 and 9. Note that in step S801, a destination program is determined using the print job type stored in association with the stored print job in step S1106. The determination result is used for the determination processing in step S804, S902, or S903. After that, the processing shown in FIG. 12 ends.

As described above, in this embodiment, the print job type corresponding to the destination program determined in step S1101 is stored in the HDD 209 in association with the stored print job created in step S1105. Then, the print job type stored in association with the stored print job in step S1106 is used for subsequent determination processing. With this arrangement, even for stored print, it is possible to prevent sheets from being used erroneously or being mixed on the discharge tray between an in-house printing operation and an office operation. Furthermore, by the determination processing in step S1203, the control unit 205 prevents a situation where the print job type for which "restricted" is set and the print job type for which "unrestricted" is set are set in the selected state concurrently. This can prevent sheets printed by an in-house printing operation and an office operation from being mixed.

FIG. 13 is a view showing an example of the stored print job print designation screen 1300 displayed by the control unit 205 on the operation unit 112. The user can print a stored print job by operating the stored print job print designation screen 1300. The stored print job print designation screen 1300 is displayed as, for example, the first screen after selecting a stored print job display button (not shown) or performing authentication by an ID card or the like.

A stored print job list 1301 is a region where a list of stored print jobs which are stored is displayed. In FIG. 13, four stored print jobs 1302, 1303, 1304, and 1305 are displayed. The stored print jobs 1302 to 1305 serve as stored print job selection buttons. Pressing by the user corresponds to a stored print job selection operation and it is determined in step S1201 that the stored print job selection operation is accepted. In step S1204, the stored print job for which the selection operation has been accepted is set in the selected state. In FIG. 13, the one stored print job 1303 is in the selected state (the state in which the user can recognize the selection). The user can cancel the selected state by re-executing the selection operation of the stored print job 1303 in the selected state.

Display 1306 or 1307 indicating a print job for which "restricted" is set is displayed when the print job type stored in association with the stored print job in step S1106 is the print job type for which "restricted" is set in the restricted print job settings stored in the RAM 208. As described with reference to FIG. 12, it is possible to prevent printed products from being mixed by executing control to prevent the print job type for which "restricted" is set and the job type for which "unrestricted" is set from being printed simultaneously. When the stored print job 1302 or 1304 for which the display 1306 or 1307 is displayed is in the selected state, the stored print job 1303 or 1305 for which such display is not displayed cannot be set in the selected state.

A close button 1308 is a button used to end the stored print job print designation screen 1300 without printing. When the close button 1308 is selected, the screen transitions to the screen before transition. A print button 1309 is a button used to print the stored print job in the selected state. The print button 1309 is selectable only when one of the stored print jobs 1302 to 1305 is in the selected state. When the print button 1309 is selected, the processes shown in FIGS. 8 and 9 are executed. The print job type used for the determination processing at this time is the print job type stored in association with the selected stored pint job in step S1106.

As described above, according to this embodiment, the print job type determined when the print job is received is stored in association with the stored print job. Then, by using the print job type for the subsequent determination processing, it is possible to prevent sheets from being used erroneously or being mixed on the discharge tray between an in-house printing operation and an office operation even in stored print. Furthermore, it is possible to prevent printed products from being mixed, by preventing a stored print job for an in-house printing operation and that for an office operation from being selected simultaneously at the time of stored print job printing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-066621, filed Apr. 14, 2023, which is hereby incorporated by reference herein in its entirety.

What is claimed is:

1. An image forming apparatus capable of accepting a plurality of types of print jobs, comprising:

one or more memories that store instructions; and one or more processors configured to execute the instructions stored in the one or more memories to set, for each type of the print job, whether to permit use of paper in a predetermined paper feed stage, control, in a case where a print job that uses the paper in the predetermined paper feed stage is received, based on the type of the received print job and the setting, whether to execute the print job that uses the paper in the predetermined paper feed stage, hold the received print job as a stored print job, display a list of the held stored print jobs on a display unit, and execute print processing based on the stored print job selected from the list, wherein in a case where a condition is satisfied, selection of a plurality of stored print jobs from the list is disabled, and wherein the condition is that the plurality of stored print jobs include a print job for which use of resources is restricted and a print job for which use of resources is unrestricted.

2. The apparatus according to claim 1, wherein the one or more processors further cause the image forming apparatus to display a setting screen for accepting the setting from a user.

3. The apparatus according to claim 1, wherein the one or more processors further cause the image forming apparatus to set, for each type of the print job, a discharge tray to which a sheet is discharged.

4. The apparatus according to claim 3, wherein the one or more processors further cause the image forming apparatus to set a default discharge tray in association with a type of a print job for which use of resources is restricted, and set a default discharge tray in association with a type of a print job for which use of resources is unrestricted.

5. The apparatus according to claim 4, wherein the default discharge tray set in association with the type of the print job for which use of resources is restricted is different from the default discharge tray set in association with the type of the print job for which use of resources is unrestricted.

6. The apparatus according to claim 1, wherein the type of the print job as the setting target includes at least one of Job Definition Format (JDF), PostScript, direct printing, and LBP Image Processing System (LIPS).

7. The apparatus according to claim 1, wherein the one or more processors further cause the image forming apparatus to change, in a case where the type of the print job which is not permitted to use the paper in the predetermined paper feed stage is received, paper to be used from the paper in the predetermined paper feed stage, and execute print processing based on the changed paper.

8. The apparatus according to claim 1, wherein the one or more processors further cause the image forming apparatus to acquire a type of the received print job, and hold, in a case where the received print job is held, the acquired type of the print job in association with the stored print job.

9. A method for an image forming apparatus capable of accepting a plurality of types of print jobs, the method comprising:

setting, for each type of the print job, whether to permit use of paper in a predetermined paper feed stage, controlling, in a case where a print job that uses the paper in the predetermined paper feed stage is received, based on the type of the received print job and the setting, whether to execute the print job that uses the paper in the predetermined paper feed stage, holding the received print job as a stored print job, displaying a list of the held stored print jobs on a display unit, and executing print processing based on the stored print job selected from the list, wherein in a case where a condition is satisfied, selection of a plurality of stored print jobs from the list is disabled, and wherein the condition is that the plurality of stored print jobs include a print job for which use of resources is restricted and a print job for which use of resources is unrestricted.

10. An image forming apparatus capable of accepting print jobs from a plurality of kinds of print applications, comprising:

a paper feed stage;

one or more memories that store instructions; and one or more processors configured to execute the instructions stored in the one or more memories to set, for each print application, whether to permit the print application to use paper in a predetermined paper feed stage, control, based on the setting, to execute a print job, that uses the paper in the predetermined paper feed stage, from a first print application permitted to use the paper in the predetermined paper feed stage, hold a received print job as a stored print job, display a list of the held stored print jobs on a display unit, and execute print processing based on the stored print job selected from the list, wherein in a case where a condition is satisfied, selection of a plurality of stored print jobs from the list is disabled, and wherein the condition is that the plurality of stored print jobs include a print job for which use of resources is restricted and a print job for which use of resources is unrestricted, and control not to execute a print job, that uses the paper in the predetermined paper feed stage, from a second print application not permitted to use the paper in the predetermined paper feed stage.

* * * * *